United States Patent
Paz et al.

(10) Patent No.: US 12,323,371 B2
(45) Date of Patent: Jun. 3, 2025

(54) SIGNALING PATTERNS FOR TIME DRIFT REFERENCE SIGNALS

(71) Applicant: QUALCOMM Incorporated, San Diego, CA (US)

(72) Inventors: Daniel Paz, Geva Carmel (IL); Michael Levitsky, Rehovot (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/859,865

(22) Filed: Jul. 7, 2022

(65) Prior Publication Data

US 2024/0014991 A1 Jan. 11, 2024

(51) Int. Cl.
*H04L 5/02* (2006.01)
*H04L 1/00* (2006.01)
(Continued)

(52) U.S. Cl.
CPC ............ *H04L 5/023* (2013.01); *H04L 1/0009* (2013.01); *H04L 1/1614* (2013.01);
(Continued)

(58) Field of Classification Search
CPC ... H04W 28/04; H04W 72/04; H04W 72/042; H04W 88/08; H04W 72/53; H04W 72/23;
(Continued)

(56) References Cited

U.S. PATENT DOCUMENTS

2015/0257133 A1* 9/2015 Kim .................. H04L 69/22
370/329
2015/0312074 A1* 10/2015 Zhu .................. H04L 5/0046
370/329
(Continued)

FOREIGN PATENT DOCUMENTS

WO WO 2019/051085 A1 * 3/2019 ............... H04L 5/00
WO WO 2020/032477 A1 * 2/2020 ............... H04L 5/00
WO WO 2021/178788 A1 * 9/2021 ............ H04W 72/04

OTHER PUBLICATIONS

International Search Report and Written Opinion—PCT/US2023/069642—ISA/EPO—Nov. 8, 2023.

*Primary Examiner* — Peter G Solinsky
*Assistant Examiner* — Sanjay K Dewan
(74) *Attorney, Agent, or Firm* — Holland & Hart LLP

(57) ABSTRACT

Methods, systems, and devices for wireless communications are described. A user equipment (UE) may transmit one or more messages that indicate a capability of the UE to support the reception of demodulation reference signals (DMRS) and time drift reference signals (TDRS) according to one or more signaling patterns configured by the network. The UE may then receive one or more control messages that indicate a first signaling pattern for one or more DMRSs and a second signaling pattern for one or more TDRSs, where the first signaling pattern corresponds to or is based on the second signaling pattern. The UE may receive a downlink shared channel multiplexed with the one or more DMRSs according to the first signaling pattern and may receive the (Continued)

downlink shared channel multiplexed with the one or more TDRSs according to the second signaling pattern.

29 Claims, 18 Drawing Sheets

(51) Int. Cl.
  *H04L 1/16*      (2023.01)
  *H04L 1/1607*    (2023.01)
  *H04L 5/00*      (2006.01)
  *H04W 72/04*     (2023.01)
  *H04W 72/23*     (2023.01)
  *H04W 72/53*     (2023.01)

(52) U.S. Cl.
  CPC ............ *H04L 5/0048* (2013.01); *H04W 72/23* (2023.01); *H04W 72/53* (2023.01)

(58) Field of Classification Search
  CPC .. H04W 72/0493; H04L 5/0007; H04L 5/023; H04L 1/0009; H04L 1/1614; H04L 5/0048
  USPC .......................................................... 370/329
  See application file for complete search history.

(56) References Cited

U.S. PATENT DOCUMENTS

2019/0200326 A1\* 6/2019 Shin ..................... H04L 5/0051
2020/0221435 A1\* 7/2020 Kim ..................... H04L 5/0048

\* cited by examiner

SIGNALING PATTERNS FOR TIME DRIFT REFERENCE SIGNALS

FIELD OF TECHNOLOGY

The following relates to wireless communications, including signaling patterns for time drift reference signals (TDRSs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support signaling patterns for time drift reference signals (TDRSs). For example, the described techniques may support high frequency wireless communications (such as communications in a Sub-Terahertz (Sub-THz) frequency band). To conserve power and reduce signaling overhead, a device may support a sparse inter-slot pattern for signaling demodulation reference signals (DMRSs), such that a device (e.g., a user equipment (UE)) may perform channel estimation using one or more DMRSs less frequently. In some cases, however, the system may be subject to inaccuracies over time, such as phase shifting or phase errors over time due to the reduced channel estimation.

To reduce accumulated error, the network may support a pattern for a narrowband reference signal or a time drift reference signal (TDRS) that is complementary to the inter-slot DMRS pattern and used for channel estimation (e.g., additional or supplemental channel estimation) between DMRS symbols or slots. The UE may signal a capability to the network to indicate support for TDRS, and may receive one or more control messages that indicate a first signaling pattern for DMRS and a second signaling pattern for TDRS. The UE may then receive a downlink shared channel that is multiplexed with the DMRS and TDRS within symbols or slots according to the first and second signaling patterns.

A method for wireless communication at a UE is described. The method may include transmitting one or more messages indicating a capability of the UE to support reception of DMRSs and TDRSs according to one or more signaling patterns, receiving, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and receiving a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

An apparatus for wireless communication at a UE is described. The apparatus may include a processor, memory coupled with the processor, and instructions stored in the memory. The instructions may be executable by the processor to cause the apparatus to transmit one or more messages indicating a capability of the UE to support reception of DMRSs and TDRSs according to one or more signaling patterns, receive, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and receive a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

Another apparatus for wireless communication at a UE is described. The apparatus may include means for transmitting one or more messages indicating a capability of the UE to support reception of DMRSs and TDRSs according to one or more signaling patterns, means for receiving, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and means for receiving a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

A non-transitory computer-readable medium storing code for wireless communication at a UE is described. The code may include instructions executable by a processor to transmit one or more messages indicating a capability of the UE to support reception of DMRSs and TDRSs according to one or more signaling patterns, receive, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and receive a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

In some examples of the method, apparatuses, and non-transitory computer-readable medium described herein, the first signaling pattern corresponds to a first allocation periodicity for the one or more DMRSs and the method, apparatuses, and non-transitory computer-readable medium may include further operations, features, means, or instructions for receiving the downlink shared channel multiplexed with the one or more TDRSs in accordance with the second signaling pattern, the second signaling pattern corresponding to a second allocation periodicity that may be associated with the first allocation periodicity.

Some examples of the method, apparatuses, and non-transitory computer-readable medium described herein may further include operations, features, means, or instructions for receiving the one or more DMRSs in accordance with the first signaling pattern and the first allocation periodicity and receiving the one or more TDRSs in accordance with the second signaling pattern and the second allocation periodicity, where the second allocation periodicity may be greater than the first allocation periodicity.

Some examples of the method, apparatuses, and non-transitory computer-readable medium described herein may further include operations, features, means, or instructions for performing a sampling timing offset (STO) correction procedure using one or more measurements associated with the one or more DMRSs of the first signaling pattern, the one or more TDRSs of the second signaling pattern, or both, based on an identified STO.

In some examples of the method, apparatuses, and non-transitory computer-readable medium described herein, performing the STO correction procedure may include operations, features, means, or instructions for performing the STO correction procedure using a measurement associated with a DMRS or a TDRS that may be temporally closest to the identified STO.

In some examples of the method, apparatuses, and non-transitory computer-readable medium described herein, performing the STO correction procedure may include operations, features, means, or instructions for performing the STO correction procedure using a measurement associated with a linear interpolation between one or more consecutive DMRSs, one or more consecutive TDRSs, or both.

Some examples of the method, apparatuses, and non-transitory computer-readable medium described herein may further include operations, features, means, or instructions for receiving an indication that the second signaling pattern may be adjusted based on the STO being greater than a STO threshold and receiving the one or more TDRSs in accordance with the adjusted second signaling pattern.

In examples of the method, apparatuses, and non-transitory computer-readable medium described herein, receiving the one or more control messages may include operations, features, means, or instructions for receiving a first indication of the first signaling pattern for the one or more DMRSs via a radio resource control (RRC) message and receiving, in accordance with the RRC message, a second indication of the second signaling pattern indicating the second signaling pattern for the one or more TDRSs via a downlink control information (DCI) message.

Some examples of the method, apparatuses, and non-transitory computer-readable medium described herein may further include operations, features, means, or instructions for receiving the DCI message that may be coupled with the first signaling pattern via a bitmap included in the DCI message.

In some examples of the method, apparatuses, and non-transitory computer-readable medium described herein, receiving the one or more control messages may include operations, features, means, or instructions for receiving, via the one or more control messages, a table that indicates at least, a first set of signaling patterns for the one or more DMRSs, the first set of signaling patterns including the first signaling pattern, a second set of signaling patterns for the one or more TDRSs, the second set of signaling patterns including the second signaling pattern, and a set of MCSs associated with the first set of signaling patterns and the second set of signaling patterns.

Some examples of the method, apparatuses, and non-transitory computer-readable medium described herein may further include operations, features, means, or instructions for selecting the first signaling pattern from the first set of signaling patterns, selecting the second signaling pattern from the second set of signaling patterns, and selecting a MCS from the set of MCSs, where the MCS may be associated with the first signaling pattern and the second signaling pattern based on the table.

Some examples of the method, apparatuses, and non-transitory computer-readable medium described herein may further include operations, features, means, or instructions for applying one or more parameters associated with the first signaling pattern to obtain the second signaling pattern, the one or more parameters including a first DMRS location, one or more DMRS generation parameters, or both.

In some examples of the method, apparatuses, and non-transitory computer-readable medium described herein, the one or more TDRSs may be allocated to a single antenna port that may be quasi-colocated with at least one antenna port associated with the one or more DMRSs.

Some examples of the method, apparatuses, and non-transitory computer-readable medium described herein may further include operations, features, means, or instructions for receiving a frequency domain allocation for the one or more TDRSs, the frequency domain allocation indicating a first set of resources allocated for the one or more TDRSs relative to a second set of resources allocated for data.

Some examples of the method, apparatuses, and non-transitory computer-readable medium described herein may further include operations, features, means, or instructions for receiving an indication of one or more allocation bandwidth thresholds associated with the one or more TDRSs, where a bandwidth associated with the one or more TDRSs may be based on a MCS and the one or more allocation bandwidth thresholds.

In some examples of the method, apparatuses, and non-transitory computer-readable medium described herein, a sequence associated with the one or more TDRSs includes a low peak to average power ratio (PAPR) sequence.

In some examples of the method, apparatuses, and non-transitory computer-readable medium described herein, the first signaling pattern includes an inter-slot DMRS pattern and the second signaling pattern includes an inter-slot TDRS pattern.

A method is described. The method may include receiving one or more messages indicating a capability of a UE to support reception of DMRSs and TDRSs according to one or more signaling patterns, transmitting, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and transmitting a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

An apparatus is described. The apparatus may include a processor, memory coupled with the processor, and instructions stored in the memory. The instructions may be executable by the processor to cause the apparatus to receive one or more messages indicating a capability of a UE to support reception of DMRSs and TDRSs according to one or more signaling patterns, transmit, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and transmit a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

Another apparatus is described. The apparatus may include means for receiving one or more messages indicating a capability of a UE to support reception of DMRSs and TDRSs according to one or more signaling patterns, means for transmitting, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and means for transmitting a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

A non-transitory computer-readable medium storing code is described. The code may include instructions executable by a processor to receive one or more messages indicating a capability of a UE to support reception of DMRSs and TDRSs according to one or more signaling patterns, transmit, based on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern, and transmit a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

In some examples of the method, apparatuses, and non-transitory computer-readable medium described herein, the first signaling pattern corresponds to a first allocation periodicity for the one or more DMRSs and the method, apparatuses, and non-transitory computer-readable medium may include further operations, features, means, or instructions for transmitting the downlink shared channel multiplexed with the one or more TDRSs in accordance with the second signaling pattern, the second signaling pattern corresponding to a second allocation periodicity that may be associated with the first allocation periodicity.

Some examples of the method, apparatuses, and non-transitory computer-readable medium described herein may further include operations, features, means, or instructions for transmitting the one or more DMRSs in accordance with the first signaling pattern and the first allocation periodicity and transmitting the one or more TDRSs in accordance with the second signaling pattern and the second allocation periodicity, where the second allocation periodicity may be greater than the first allocation periodicity.

Some examples of the method, apparatuses, and non-transitory computer-readable medium described herein may further include operations, features, means, or instructions for adjusting the second signaling pattern based on an identified STO being greater than a STO threshold and transmitting the one or more TDRSs in accordance with the adjusted second signaling pattern.

In some examples of the method, apparatuses, and non-transitory computer-readable medium described herein, transmitting the one or more control messages may include operations, features, means, or instructions for transmitting a first indication of the first signaling pattern for the one or more DMRSs via an RRC message and transmitting, in accordance with the RRC message, a second indication of the second signaling pattern indicating the second signaling pattern for the one or more TDRSs via a DCI message.

Some examples of the method, apparatuses, and non-transitory computer-readable medium described herein may further include operations, features, means, or instructions for transmitting the DCI message that may be coupled with the first signaling pattern via a bitmap included in the DCI message.

In some examples of the method, apparatuses, and non-transitory computer-readable medium described herein, transmitting the one or more control messages may include operations, features, means, or instructions for transmitting, via the one or more control messages, a table that indicates at least, a first set of signaling patterns for the one or more DMRSs, the first set of signaling patterns including the first signaling pattern, a second set of signaling patterns for the one or more TDRSs, the second set of signaling patterns including the second signaling pattern, and a set of MCSs associated with the first set of signaling patterns and the second set of signaling patterns.

In some examples of the method, apparatuses, and non-transitory computer-readable medium described herein, the one or more TDRSs may be allocated to a single antenna port that may be quasi-colocated with at least one antenna port associated with the one or more DMRSs.

Some examples of the method, apparatuses, and non-transitory computer-readable medium described herein may further include operations, features, means, or instructions for transmitting a frequency domain allocation for the one or more TDRSs, the frequency domain allocation indicating a first set of resources allocated for the one or more TDRSs relative to a second set of resources allocated for data.

Some examples of the method, apparatuses, and non-transitory computer-readable medium described herein may further include operations, features, means, or instructions for receiving an indication of one or more allocation bandwidth thresholds associated with the one or more TDRSs, where a bandwidth associated with the one or more TDRSs may be based on a MCS and the one or more allocation bandwidth thresholds.

In some examples of the method, apparatuses, and non-transitory computer-readable medium described herein, a sequence associated with the one or more TDRSs includes a low PAPR sequence.

In some examples of the method, apparatuses, and non-transitory computer-readable medium described herein, the first signaling pattern includes an inter-slot DMRS pattern and the second signaling pattern includes an inter-slot TDRS pattern.

DETAILED DESCRIPTION

Figure 1:
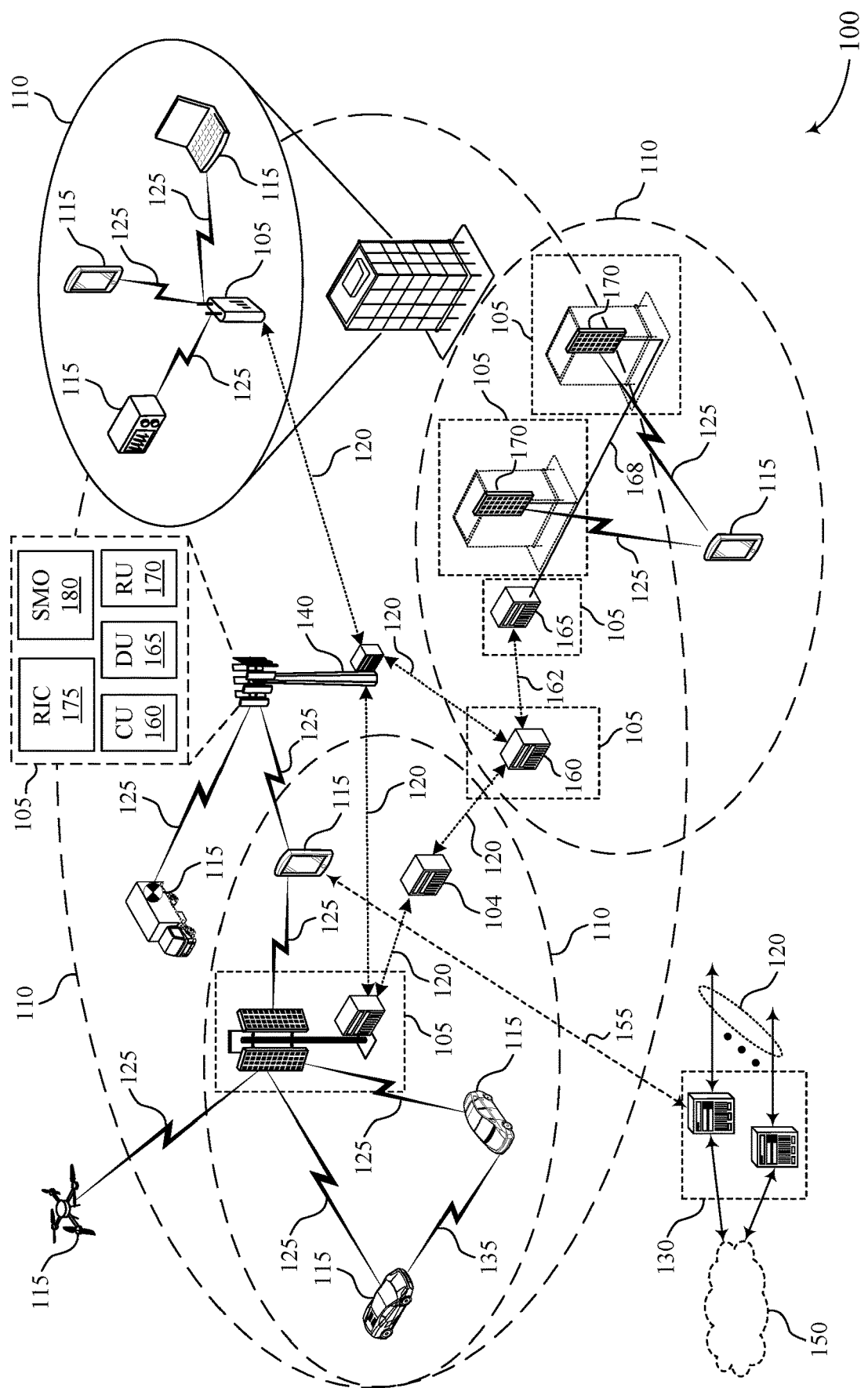
FIGS. 1-3 illustrate examples of wireless communications systems that support signaling patterns for time drift reference signals (TDRSs) in accordance with one or more aspects of the present disclosure.

Some high frequency wireless systems (for example, wireless systems that support Sub-Terahertz (Sub-THz) frequencies) may operate using a short slot duration and increased subcarrier spacing relative to lower frequency bands (e.g., frequency range 1 (FR1) and frequency range 2 (FR2)). To conserve power and reduce signaling overhead, devices in the high frequency wireless system may implement a sparse inter-slot pattern for signaling demodulation reference signals (DMRSs), which allows the network to transmit DMRS less frequently according to a sparse inter-slot DMRS pattern, such that a user equipment (UE) may perform channel estimation less frequently rather than in every slot. The sparse inter-slot DMRS pattern reduces physical downlink shared channel (PDSCH) pilot overhead and may correspondingly increase data rates for the Sub-THz band. In some cases, however, since the UE performs channel estimation less frequently, the system may accumulate sampling timing offset (STO) or phase error over time due to the lack of channel estimation per slot. In addition, the Sub-THz band may be especially sensitive to uncompensated STO and phase error due to the short sampling time and short slot duration of the single carrier-orthogonal frequency division multiplexing (SC-OFDM) waveform used for Sub-THz systems.

A wireless system may implement a number of different techniques to support efficient and relatively low power mitigation of the residual phase drift or phase error accumulated when a sparse inter-slot DMRS pattern is used. For example, the network may employ a narrowband reference signal or a time drift reference signal (TDRS) pattern that is complementary to the inter-slot DMRS pattern and used for additional or supplemental channel estimation between DMRS symbols. The use of TDRS may also consume less power and may have a lower complexity than allocating a full DMRS symbol for channel estimation. Using an additional TDRS pattern may also allow a higher sparsity level (or lower inter-slot density) for the inter-slot DMRS pattern to further reduce DMRS overhead and UE complexity and power consumption related to channel estimation and equalization.

The network may configure (via a radio resource control (RRC) configuration, downlink control information (DCI), or other signaling) the sparse DMRS pattern for the UE to use, and may also configure a sparse TDRS that is coupled with the DMRS pattern, where each TDRS occasion occurs between two DMRS occasions. The network may also configure multiple different DMRS-TDRS signaling patterns (coupled with a corresponding modulation and coding scheme (MCS)) that the UE may select from based on factors such as varying channel conditions.

Aspects of the disclosure are initially described in the context of wireless communications systems. Aspects of the disclosure are further illustrated by and described with reference to a process flow, apparatus diagrams, system diagrams, and flowcharts that relate to signaling patterns for TDRS.

FIG. 1 illustrates an example of a wireless communications system 100 that supports signaling patterns for TDRS in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor.

One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support signaling patterns for TDRS as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of short TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300

GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Wireless communications system 100 may support high frequency communications (such as Sub-THz communications) and may operate using a short slot duration and increased subcarrier spacing relative to lower frequency bands (e.g., FR1 and FR2). To conserve power and reduce signaling overhead, devices such as UEs 115 and network entities 105 may implement a sparse inter-slot pattern for signaling DMRS, such that a UE 115 may perform channel estimation less frequently to conserve power and signaling overhead while increasing data rates. In some cases, however, since the UE 115 performs channel estimation less frequently, the system may accumulate STO or phase error over time due to the lack of channel estimation per slot.

In some examples, the wireless communications system 200 may employ an additional narrowband reference signal or a TDRS pattern that is complementary to the inter-slot DMRS pattern and used for additional or supplemental channel estimation between DMRS symbols. The use of TDRS may also consume less power and may have a lower complexity than allocating a full DMRS symbol for channel estimation. Using an additional TDRS pattern may also allow a higher sparsity level (or lower inter slot density) for the inter-slot DMRS pattern to further reduce DMRS overhead and UE complexity.

Figure 2:
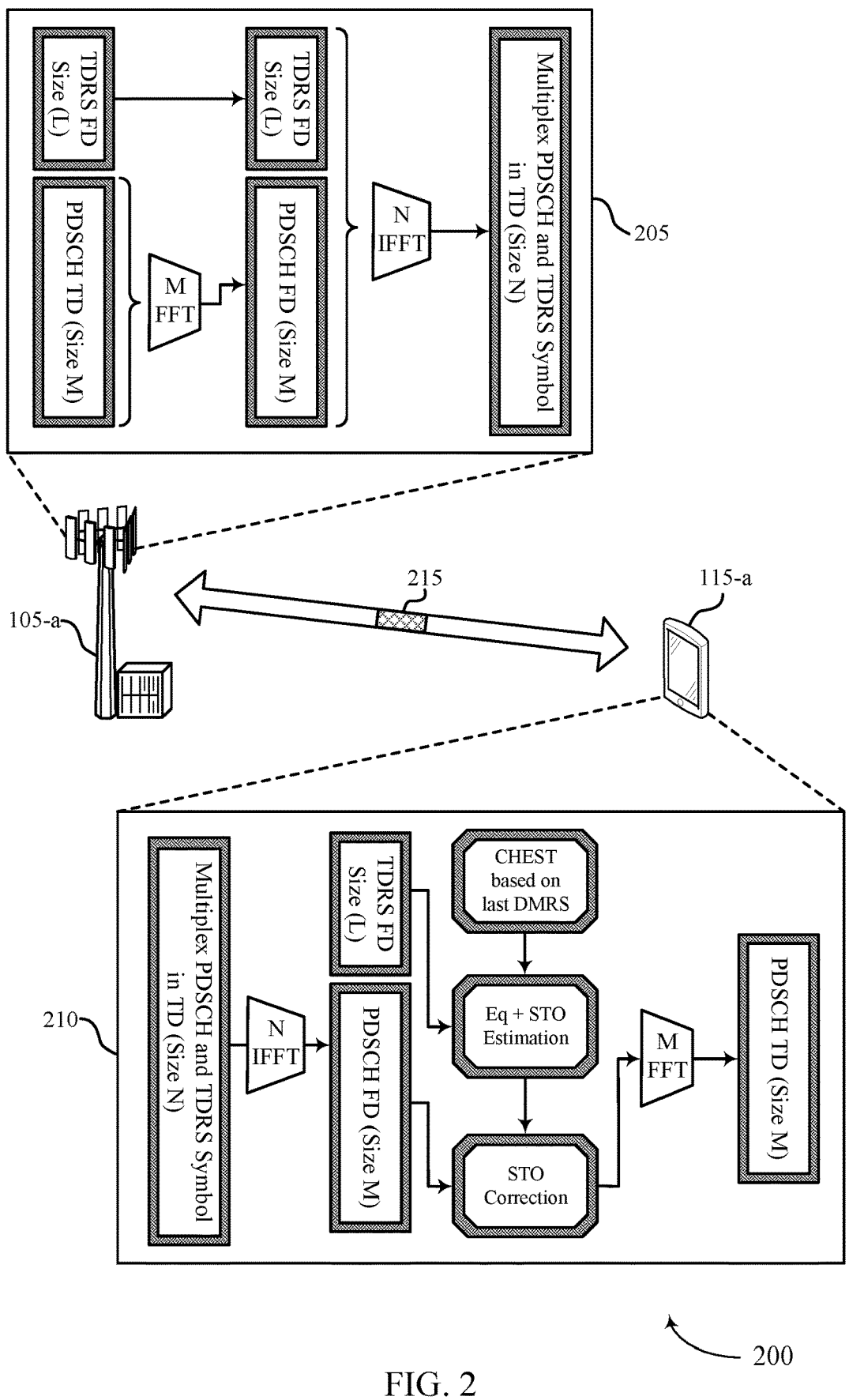

FIG. 2 illustrates an example of a wireless communications system 200 that supports signaling patterns for TDRS in accordance with one or more aspects of the present disclosure. For example, wireless communications system 200 may support communications between a UE 115-a and a network entity 105-a, which may be examples of corresponding devices described with reference to FIG. 1.

Some wireless communications systems (e.g., high frequency systems that operate using sub-THz frequencies) such as wireless communications system 200 may have relatively static (e.g., flat) channel conditions due to factors such as a low delay spread, relatively strong line-of-sight component, and low mobility of the UEs operating in the sub-THz band. Such high frequency systems, however, may also have increased phase noise relative to lower frequency bands due to increased carrier frequency and increased sub-carrier spacing (e.g., relative to FR2). In some cases, this may result in a short sampling time and short OFDM symbol and slot duration, and the short slot duration combined with the effectively static channel assumption may result in a channel coherency time that covers multiple slots of the sub-THz band.

To mitigate relatively high levels of phase noise associated with the Sub-THz band, wireless devices may implement an single carrier OFDM (SC-OFDM) waveform with time domain phase tracking reference signal (TD-PTRS) as a waveform candidate. In addition, the TD-PTRS may allow the UE 115-a to estimate and mitigate any residual or accumulated frequency offset to reduce phase drift or phase error accumulation as a function of time for Sub-THz bands. Such reduction of accumulated frequency offset may further reduce or eliminate effective channel variation in time (e.g., via Common Phase Error (CPE) correction per OFDM symbol).

In order to support low channel estimation error (e.g., relative to a channel estimation threshold or floor) related to channel time interpolation and time coherency characteristic, some wireless communications systems may implement a sparse inter-slot DMRS pattern for channel estimation. In such cases, DMRS symbols may be allocated once every few slots using a configured inter-slot DMRS pattern (e.g., rather than once per slot). In some examples, the wireless communications system 200 may support dynamic selection of the inter-slot DMRS pattern to support a higher channel estimation robustness (e.g., accuracy) under different levels of accumulated residual time drift between the nearest DMRS symbols under different levels of signal to noise ratio (SNR). In some cases, the inter-slot DMRS pattern may be allocated using control signaling such as a DCI which schedules multiple consecutive data slots.

In some implementations, the sparse inter-slot DMRS pattern may reduce signaling overhead (e.g., PDSCH pilot overhead) and may increase data rates for the Sub-THz band. In some examples, the high frequency communications associated with the Sub-THz band may support a high volume of data that may be scheduled using a burst-style data transmission, such that the network entity 105-a allocates the UE 115-a with multiple slots (transmitted back-to-back) in advance via a single DCI scheduling (e.g., a jumbo packet). In such cases, the network may allocate the sparse inter-slot DMRS pattern to accommodate this burst-style slot allocation using an RRC configuration or a dynamic allocation signaled by DCI or a MAC-CE. A dynamic selection of the inter slot DMRS pattern may support dynamic adjustments to channel estimation based on different levels of accumulated residual time drift between the nearest DMRS symbols under different levels of SNR. In some examples, the inter-slot DMRS pattern may be configured by the scheduling DCI and may be signaled via bitmap indication or DCI field corresponding to DMRS symbol allocation (e.g., in the first and the last slots of a jumbo allocation).

In some cases, the component carrier spacing, high bandwidth, and wideband resource allocation associated with the Sub-THz band may increase the sensitivity to uncompensated STO for communication. For example, uncompensated STO (or STO due to time drift) may introduce a non-negligible phase deviation for frequency domain channel estimates (e.g., from channel estimates obtained from the nearest DMRS symbols or slots). In cases that an OFDM waveform is used and a sparse inter-slot DMRS pattern, non-compensated STO error ($STO_{err}$) developed during the multi-slot allocation time may result in channel mismatch as a function of data RE index (k) and OFDM symbol index (n) given by:

$$H_{err}(k,n) = \exp^{-j \cdot 2 \cdot pi \cdot RE_{BW} \cdot k \cdot STO_{err}(n)}.$$

In such cases, the channel mismatch may result in phase rotation of data resource elements (e.g., constellation rotation as a function of resource element index).

In some cases, residual STO mitigation may be performed using frequency domain phase tracking reference signal (FD-PTRS) the network may allocate with some density over the entire bandwidth to estimate and correct accumulated STO (e.g., via phase slope estimation in frequency domain). In some other cases (e.g., using SC-OFDM waveforms), non-compensated $STO_{err}$ will result in inter-symbol interference (ISI) for time domain data symbols. To compensate for STO error, the network may implement a TD-PTRS allocation to estimate TD equalizer response for the STO, and mitigate ISI based on TD-PTRS.

In some cases, however, this estimation and TD equalizer application for TD data symbols on every OFDM symbol may result in a significant processing and corresponding power consumption penalty. This increased processing and power consumption may be further amplified for high frequency systems such as Sub-THz systems. Correspondingly, Sub-THz systems using SC-OFDM waveforms will also experience modulation and coding scheme (MCS) limitations and block error rate (BLER) floor as a result of a non-compensated STO and time drift for mid/high SNR regime (e.g., SNR above one or more thresholds) and based on the short time domain symbols and short cyclic prefix duration associated with the Sub-THz band.

Accordingly, some wireless communications systems may support different sparsity levels (e.g., density across slots) for an inter-slot DMRS pattern for the SC-OFDM waveform (e.g., at least for cases that mid to high levels of SNR are expected). To ensure a sufficient time tracking accuracy for sparse inter-slot DMRS pattern and to reduce an uncompensated STO, the time and frequency tracking loops may be updated at a higher rate relative to lower bands. In such cases, the steady state variance and residual error (e.g., ppm_err) of the loops may be low (e.g., below 0.1 ppm).

In some examples, frequency offset estimation accuracy (and the corresponding residual ppm_err) may present challenges in the Sub-THz band compared to lower frequency bands due to a higher impact of phase noise on the estimation variance, and a lower observation time. Such observation times may define the Cramer Rao lower bound (CRLB) for a single frequency offset estimation session (e.g., open loop estimation) because of a relatively higher numerology in Sub-THz bands. Additionally or alternatively, lower bands may implement a higher loop averaging factor and processing gain for time and frequency tracking loops to achieve at least a threshold level of time tracking accuracy, where Sub-THz bands may have a higher synchronization pilot reference signal overhead. The tracking loop accuracy (and the corresponding residual time drift) may in some cases depend on the effective synchronization pilot reference signal periodicity (synchronization signal block (SSB)+ tracking reference signal (TRS)+effective rate of PDSCH allocations). The achievable accuracy may also depend on the UE SNR which determines the open loop estimation variance residual error level (e.g., in order to not limit the corresponding operational MCS).

In some cases, however, techniques that update time and frequency tracking loop estimation may increase the synchronization reference signal overhead (SSB and TRS overhead) and will limit UE sleep time opportunities and the duration of sleep time opportunities, which may lead to reduced power efficiency and battery lifetime for the UE 115-a. Although a denser inter-slot DMRS pattern may increase channel estimation accuracy and reduce phase offset error, increasing the density of the DMRS pattern may also increase the downlink signaling overhead.

To mitigate the impact of residual accumulated STO across slots while reducing overhead and processing complexity, a wireless communications system may support a narrowband reference signal (or a reference signaling pattern) such as TDRS that is implemented in addition to (or complementary to) the sparse inter-slot DMRS pattern for multi slot allocations. In some examples, the TDRS pattern may be allocated in addition to a multi slot PDSCH allocation and may be coupled to a sparse inter-slot wide band DMRS pattern (e.g., the narrowband reference signal pattern may not be periodic in time like SSB, TRS, or any other synchronization reference signal for time and frequency tracking loops). In some examples, the TDRS pattern may be allocated with a higher inter-slot density (e.g., relative to the inter-slot DMRS pattern) implemented across slots of a multi slot allocation, and may support residual STO and timing drift estimation and correction for PDSCH intermediate slots between slots with DMRS. In some examples, the TDRS may have reduced complexity compared to an allocation of wide band DMRS symbols, and may further support the reduction of residual STO and related error vector magnitude (EVM).

In some examples, the inter-slot pattern and density of the TDRS (and the bandwidth associated with the narrowband reference signal) may be dynamically configured based on multiple dynamic factors such as the UE SNR, residual ppm error, timing drift rate, effective synchronization pilot signal or reference signal periodicity (e.g., SSB+TRS+effective rate of PDSCH allocations), and inter-slot DMRS pattern. In some examples, the TDRS signal waveform may be an SC-OFDM waveform allocated using consecutive resource elements. To reduce overhead, the bandwidth occupied by the narrowband reference signal may be relatively low (e.g., compared to DMRS) but above a threshold to support accurate STO estimation. In such cases, the bandwidth of the TDRS may be configured dynamically to address different UE reception conditions (e.g., SNR or operational MCS).

In some examples, the network may configure (e.g., via control signaling 215) a sparse inter-slot TDRS pattern to implement in addition to the sparse DMRS pattern to increase channel estimation accuracy while reducing complexity and signaling overhead. The inter-slot TDRS pattern may allow for lower power channel estimation relative to DMRS, and may allow for a higher sparsity level (or lower inter-slot density) for the inter-slot DMRS pattern to further DMRS overhead reduction, UE complexity reduction, and power reduction related to channel estimation and equalization.

TDRS may be implemented enhance channel estimation and to correct for uncompensated STO (due to inter-slot time drift that may result in phase deviation in the frequency domain or inter-slot interference for the time domain. For example, TDRS may be implemented for SC-OFDM on symbols or slots which in between DMRS symbols. The TDRS may thus account for time drift that may occur between relatively distant DMRS symbols.

In some implementations, the network entity 105-*a* may multiplex the TDRS with a downlink shared channel (e.g., PDSCH) using procedure 205. While the data in the PDSCH may be transmitted using an SC-FDM waveform, to capture the residual STO in the frequency domain based on TDRS, the TDRS may be transmitted using an OFDM waveform. In order to multiplex the TDRS (e.g., OFDM based) and PDSCH (e.g., SC-FDM based) on the same symbol, the network entity may first perform DFT precoding with size M applied on the M PDSCH data symbols. The network entity 105-*a* may generate FD TDRS complex symbols and a TDRS pattern or sequence of size L. In some examples, the size L may be determined based on UE allocation bandwidth or PDSCH allocation bandwidth (e.g., N REs), and M (e.g., the number of PDSCH data symbols).

To enable the use of efficient discrete Fourier transform (DFT) and inverse discrete Fourier transform (IDFT) implementation algorithms, the TDRS size (e.g., L) may be determined by a threshold associated with PDSCH data size (M) for SC-OFDM waveforms where the full allocation size on data carrying OFDM symbols (N) is limited by a size resulting from combinations of $2^a \cdot 3^b \cdot \cdot 5^c$, where a, b, and c are positive integers. Correspondingly, valid TDRS size (L) values may be defined based on a one or more values of N and M such that L=N−M.

In some examples, the network entity 105-*a* may concatenate the L TDRS resource elements and M post-DFT PDSCH resource elements into a single frequency domain vector of size N which corresponds to a full PDSCH allocation size on OFDM symbols without TDRS. Then, the network entity 105-*a* may apply an N-IFFT operation on the concatenated resource elements. The network entity 105-*a* may transmit the resulting time domain vector via a time domain signal (e.g., associated with a UE allocation at a scheduled time in a Sub THz band). In addition, the network entity 105-*a* may add time domain samples vector based on the last K samples. In some cases, several UE allocations may be multiplexed together in the frequency domain, and the several UE allocations may be concatenated in the frequency domain before inverse fast-Fourier transform (IFFT).

Since the ppm error is common for all layers or ports of the network entity 105-*a*, the introduced time drift will be also the same on all the layers. Thus, the network entity 105-*a* may allocate the TDRS to a single layer or port (e.g., the network entity 105-*a* may transmit data with two layers or more). Although the example depicted in FIG. 2 illustrates a single layer transmission for both TDRS and PDSCH, the procedure may be extended for more than a single layer SC-OFDM PDSCH transmission scenario without changing the TDRS allocation.

In addition to the multiplexing procedure for PDSCH and TDRS performed by the network entity 105-*a*, the UE 115-*a* may implement various techniques to receive and process the TDRS multiplexed with the PDSCH using procedure 210. The UE 115-*a* may apply an N-fast Fourier transform (FFT) operation on the received time domain vector, which contains the multiplexed TDRS and PDSCH samples. After the FFT operation, the UE 115-*a* may extract the resource elements corresponding to the TDRS and may use the resource elements to estimate the STO. In such cases, the UE 115-*a* performs channel estimation based on the last DMRS symbol available prior to the TDRS processing. The UE 115-*a* may implement the channel estimation (CHEST) to perform minimum mean squared error (MMSE) equalization and maximal ratio combining (MRC) on the TDRS resource elements. The UE 115-*a* may estimate the STO and may use the estimated STO to apply sampling offset timing correction on the PDSCH resource elements in the frequency domain including all the next PDSCH symbols until the next TDRS or DMRS symbol occasion. Additionally or alternatively, the UE 115-*a* may correct the PDSCH channel estimation based on the estimated STO.

In some other examples, the UE 115-*a* may perform an interpolation of the estimated STO for intermediate data OFDM symbols (e.g., between consecutive TDRS and DMRS symbols). After performing the STO correction, the UE 115-*a* may perform the M IDFT operation on the PDSCH to extract the PDSCH TD symbols to be used for the rest of the receiver chain processing.

Figure 3:
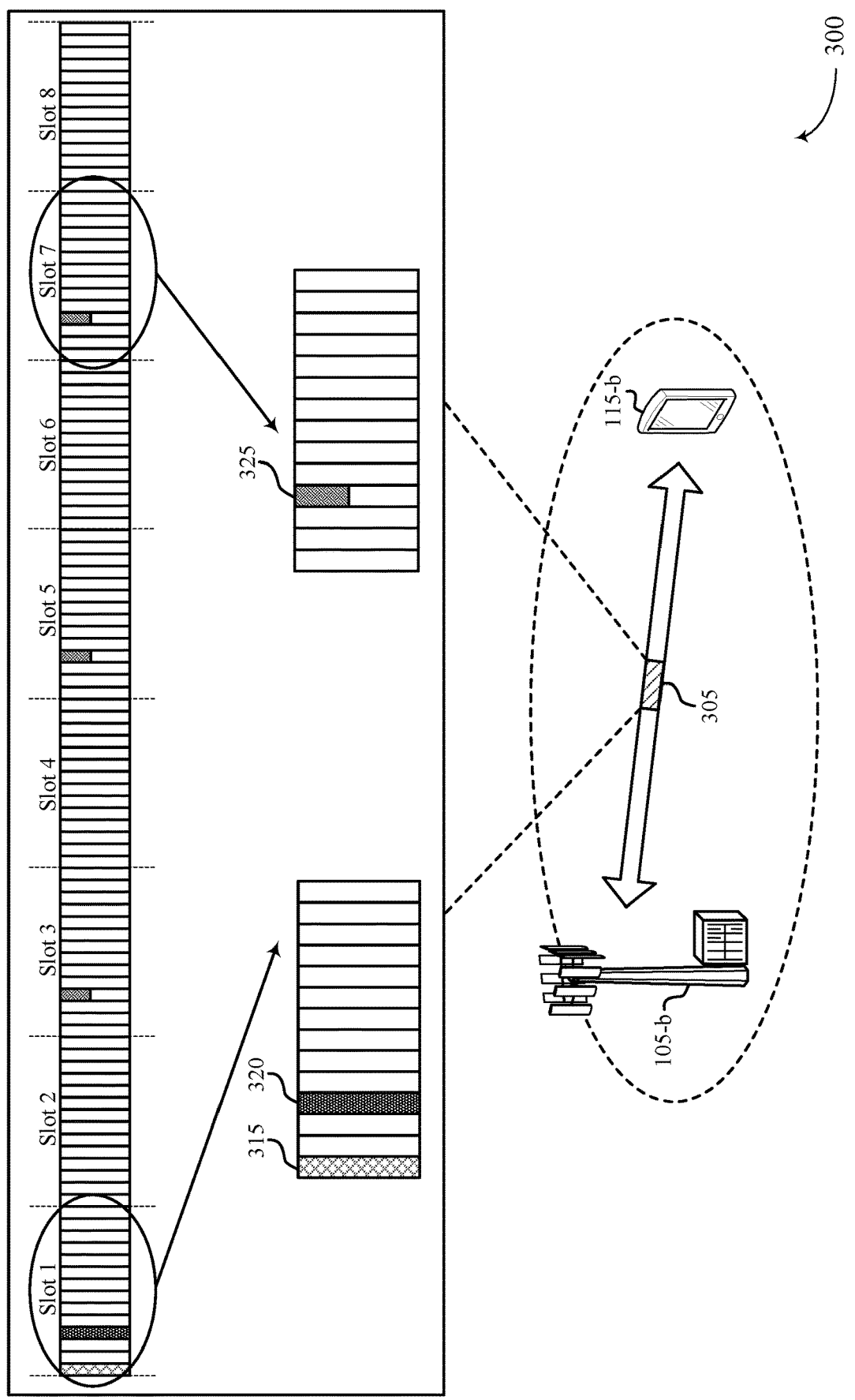

FIG. 3 illustrates an example of a wireless communications system 300 that supports signaling patterns for TDRS in accordance with one or more aspects of the present disclosure. For example, wireless communications system 300 may support communications between a UE 115-b and a network entity 105-b, which may be examples of corresponding devices described with reference to FIGS. 1 and 2.

The wireless communications system 300 may be an example of a Sub-THz system that supports high frequency communications. The wireless communications system 300 may employ signaling patterns for sparse inter-slot DMRS and sparse inter-slot TDRS (that is complementary to the inter-slot DMRS pattern) across a multi-slot allocation 305, which may be used for additional or supplemental channel estimation between DMRS symbols. In this example, the multi-slot allocation 305 includes 8 slots (slot 1 through slot 8).

The network entity 105-b may transmit (e.g., via an RRC, DCI, or other control signaling 315) an indication of a sparse inter-slot DMRS pattern (e.g., including symbols for DMRS 320) for a multi-slot allocation 305 (e.g., a jumbo allocation), where each slot duration in this example is 14 symbols. Here, the DMRS pattern indicates one symbol for the DMRS 320 (e.g., the 4th symbol in Slot 1) across the 8 slots of the multi-slot allocation 305 (or 1 symbol every 8 slots). The network entity 105-b may transmit the control signaling 315 via a physical downlink control channel (PDCCH). In some examples, the control signaling 315 may also indicate a sparse inter-slot TDRS pattern (e.g., including TDRS 325) that is complementary to the sparse inter-slot DMRS pattern. In this example, the sparse inter-slot TDRS pattern indicates one symbol for the TDRS 325 in each of Slot 3, Slot 5, and Slot 7 (or 3 symbols every 8 slots). In some examples, the inter-slot DMRS pattern may be RRC configured by selecting the configuration option which corresponds to DMRS symbol allocation on the first slot out of 8 consecutive slots of multi-slot allocation 305. Additionally or alternatively, the TDRS inter-slot pattern may be configured or signaled such that the inter-slot TDRS pattern is complementary to the inter-slot DMRS pattern. For example, in the multi-slot allocation 305, the DMRS 320 is allocated according to a first inter-slot pattern, and the TDRS 325 is allocated on the fourth symbol on each second slot where DMRS is not allocated, and allows for STO estimation every 28 OFDM symbols. In such cases, the UE 115-b may perform STO correction based on the nearest (e.g., temporally closest) TDRS or DMRS symbol based STO estimation (e.g., zero order hold), or the UE 115-b may perform STO correction based on a linear interpolation between two estimations on consecutive TDRS and DMRS symbols. In some other examples, the UE 115-b may implement STO forward prediction techniques to further account for accumulated STO.

In some examples, the network entity 105-b may adjust the inter-slot TDRS pattern over time to align with a threshold (e.g., expected) measured residual error (e.g., ppm err). In such examples, the inter-slot TDRS pattern may be designed to such that the EVM degradation due to STO mismatches stay below a pre-defined threshold.

In some cases, the network entity 105-b may implement single DCI scheduling for multiple slots associated with the multi-slot allocation 305. In such cases that a single DCI schedules multiple back-to-back slots, a subset of the scheduled slots may be allocated with a symbol carrying DMRS (e.g., with a sparse inter-slot DMRS pattern) or a symbol carrying the complementary TDRS allocation (e.g., with a sparse inter-slot TDRS pattern).

In some cases, the sparse inter-slot TDRS pattern may be allocated and applied based on whether the UE 115-b also supports a sparse inter-slot DMRS pattern (e.g., based on the corresponding UE capabilities for inter-slot DMRS). The UE 115-b may transmit a capability to support TDRS to notify the network entity 105-b of its capabilities to support inter-slot TDRS.

In some examples, the inter-slot DMRS pattern and corresponding inter-slot TDRS pattern may be dynamically configured, statically configured or semi-statically configured. For example, the configuration for inter-slot DMRS and inter-slot TDRS may be configured via RRC signaling, DCI, or MAC-CE. In one example, the inter-slot TDRS pattern over the multi-slot allocation 305 may be signaled dynamically based on DCI coupled to the inter-slot DMRS pattern (e.g., using an additional bitmap in the DCI). In such examples, the inter-slot TDRS pattern may be signaled dynamically as the sensitivity for a residual non-corrected STO may be based on channel conditions (e.g., UE SNR, UE MCS), and since the residual time drift may further be based on the SNR (e.g., tracking loops accuracy).

In some other examples, the inter-slot TDRS pattern may be coupled to an MCS and the inter-slot DMRS pattern via an RRC configured table. For example, the entries of the RRC configured table may be based on the MCS that is signaled in the DCI and RRC configured inter-slot DMRS pattern. In such cases, the inter-slot TDRS pattern may be RRC configured (e.g., rather than dynamically signaled).

In some implementations, the inter-slot TDRS pattern may be determined based on the inter-slot DMRS pattern. For example, the inter-slot TDRS pattern may reuse one or more DMRS configurations such that is the parameters configured for DMRS (e.g., first DMRS symbol location and DMRS sequence generation parameters) may be reused or applied for the TDRS as well. In some examples, the TDRS may be allocated to a single port or to a single layer (e.g., via an RRC configuration or otherwise predefined), which should be quasi-colocated with one of DMRS ports associated with the inter-slot DMRS.

In some cases, the TDRS location in the frequency domain (e.g., consecutive resource elements in the frequency domain) may be configured on the upper side edge or lower side edge of the data allocation (e.g., as predefined or configured and signaled via an RRC, DCI, or MAC-CE). Additionally or alternatively, the TDRS bandwidth may be dynamically configurable (e.g., via DCI or MAC-CE), or may be coupled to and MCS index and allocation bandwidth based on an RRC configured MCS and one or more allocation thresholds. In some examples, the transport block size may be based on the inter-slot TDRS allocation and the DMRS allocation. In some examples, the UE 115-b may implement rate matching for DMRS 320, but may not implement rate matching for receiving the TDRS allocation.

In some cases, the sequence used to generate the TDRS 325 may be low peak-to-average power ratio (PAPR) sequence to complement the low PAPR conditions associated with the SC-OFDM waveform implemented for Sub-THz systems. In some examples, the TDRS sequences may be the same as (or may be based off of) one or more existing DMRS sequences, and various DMRS definitions and parameters may be reused for TDRS 325.

The use of the inter-slot TDRS pattern may consume less power (from the perspective of both the UE 115-b and the network entity 105-b) and may have a lower complexity than allocating a full DMRS 320 (e.g., one or more DMRSs 320 per slot) for channel estimation. Using an additional TDRS pattern may also allow a higher sparsity level (e.g., a lower inter-slot density) for the inter-slot DMRS pattern to further reduce DMRS 320 overhead and UE complexity related to channel estimation and equalization.

Figure 4:
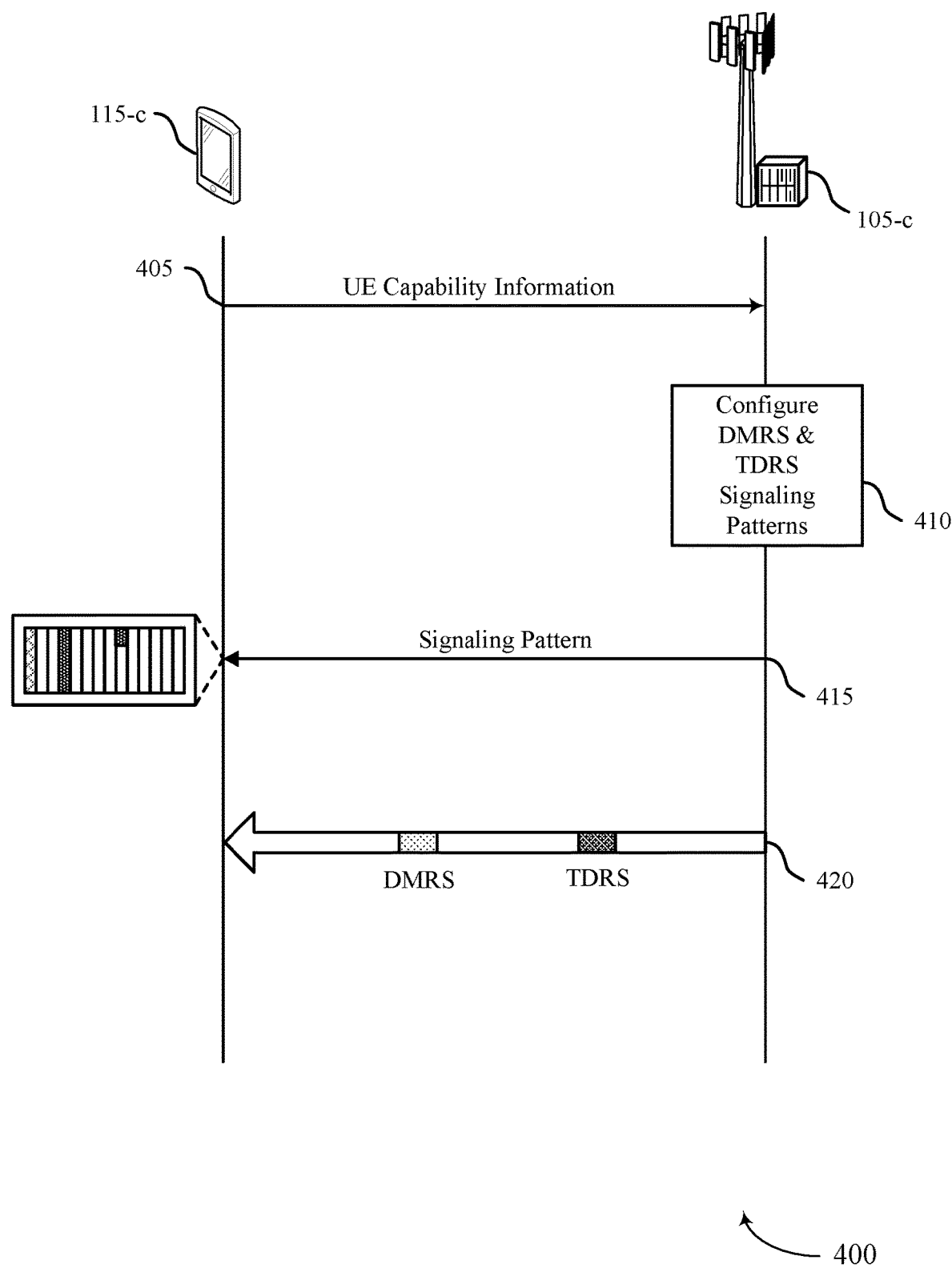
FIG. 4 illustrates an example of a process flow that supports signaling patterns for TDRSs in accordance with one or more aspects of the present disclosure.

FIG. 4 illustrates an example of a process flow 400 that supports signaling patterns for TDRS in accordance with one or more aspects of the present disclosure. Process flow 400 may be performed by a network entity 105-c and a UE 115-c, which may be examples of corresponding devices described herein. In some examples, process flow 400 may illustrate an exemplary sequence of operations performed to support complementary narrowband TDRS for space inter-slot DMRS patterns in a sub-THz band. It is understood that one or more of the operations described in process flow 400 may be performed earlier or later in the process, omitted, replaced, supplemented, or combined with another operation. Also, additional operations described herein that are not included in process flow 400 may be included in process flow 400.

At 405, the UE 115-c may transmit one or more messages that indicate a capability of the UE 115-c to support reception of DMRSs and TDRSs according to one or more signaling patterns.

At 410, the network entity 105-c may configure one or more a first signaling pattern for one or more DMRSs (e.g., an inter-slot DMRS pattern) and a second signaling pattern for one or more TDRSs (e.g., an inter-slot TDRS pattern), the first signaling pattern corresponding to the second signaling pattern.

At 415, the network entity 105-c may transmit, and the UE 115-c may receive, one or more control messages indicating the first signaling pattern for the one or more DMRSs via a set of (e.g., one or more) TTIs and a second signaling pattern for the one or more TDRSs via the set of TTIs. In some cases, the network entity 105-c may transmit the first and second signaling patterns based on a capability of the UE 115-c to support DMRS and TDRS. In some examples, the UE 115-c may receive a first indication of the first signaling pattern via an RRC message, and then may receive a second indication of the second signaling pattern via a DCI message. In some examples, the UE 115-c may receive the DCI message that is coupled with the first signaling pattern via a bitmap included in the DCI message. In some examples, a sequence associated with the one or more TDRSs is configured to be a low PAPR sequence.

In some implementations, the UE 115-c may receive, via the one or more control messages, a table that indicates a first set of (e.g., one or more) signaling patterns for the one or more DMRSs, a second set of (e.g., one or more) signaling patterns for the one or more TDRSs, and a set of MCSs associated with the first set of signaling patterns and the second set of signaling patterns. The UE 115-c may select the first signaling pattern from the first set of signaling patterns, the second signaling pattern from the second set of signaling patterns, and an MCS from the set of MCSs. In such cases, the MCS is associated with the first signaling pattern and the second signaling pattern based on the received table. In some examples, the UE 115-c may receive an indication of one or more allocation bandwidth thresholds associated with the one or more TDRSs. In such examples, the bandwidth associated with the one or more TDRSs is based on a MCS and the one or more allocation bandwidth thresholds.

In some other examples, the UE 115-c may apply one or more parameters (e.g., DMRS parameters such as a first DMRS location, one or more DMRS generation parameters) associated with the first signaling pattern in order to obtain the second signaling pattern. In some examples, the one or more TDRSs may be allocated to a single antenna port that is quasi-colocated with at least one antenna port associated with the one or more DMRSs. In some other examples, the UE 115-c may receive a frequency domain allocation for the one or more TDRSs which indicates a first set of (e.g., one or more) resources allocated for the one or more TDRSs relative to a second set of (e.g., one or more) resources allocated for data.

At 420, the UE 115-c may receive a downlink shared channel (e.g., a PDSCH) the one or more DMRSs, and the TDRSs via the set of TTIs. In some examples, the downlink shared channel may be multiplexed with the one or more DMRSs according to the first signaling pattern and may be multiplexed with the one or more TDRSs according to the second signaling pattern. In some examples, the first signaling pattern may correspond to a first allocation periodicity for the one or more DMRS. The UE 115-c may receive the downlink shared channel multiplexed with the one or more TDRSs in accordance with the second signaling pattern. In such cases, the second signaling pattern may correspond to a second allocation periodicity that is associated with the first allocation periodicity (e.g., the second allocation periodicity may complement the first allocation periodicity).

The UE 115-c may receive the one or more DMRSs in accordance with the first signaling pattern and the first allocation periodicity and may receive the one or more TDRSs in accordance with the second signaling pattern and the second allocation periodicity. In some examples, the second allocation periodicity may be greater than the first allocation periodicity (e.g., the UE 115-c may receive TDRS more frequently than the DMRS).

In some examples, the UE 115-c may perform a STO correction procedure using one or more measurements associated with the one or more DMRSs of the first signaling pattern, the one or more TDRSs of the second signaling pattern, or both, based on an identified STO. In some cases, the UE 115-c may perform the STO correction procedure using a measurement associated with a DMRS or a TDRS that is temporally closest to the identified STO. In some other cases, the UE 115-c may perform the timing offset correction procedure using a measurement associated with a linear interpolation between one or more consecutive DMRSs, one or more consecutive TDRSs, or both. In some examples, the UE 115-c may receive an indication that the second signaling pattern is adjusted based on the STO being greater than a STO threshold, and the UE 115-c may receive the one or more TDRSs in accordance with the adjusted second signaling pattern.

Figure 5:
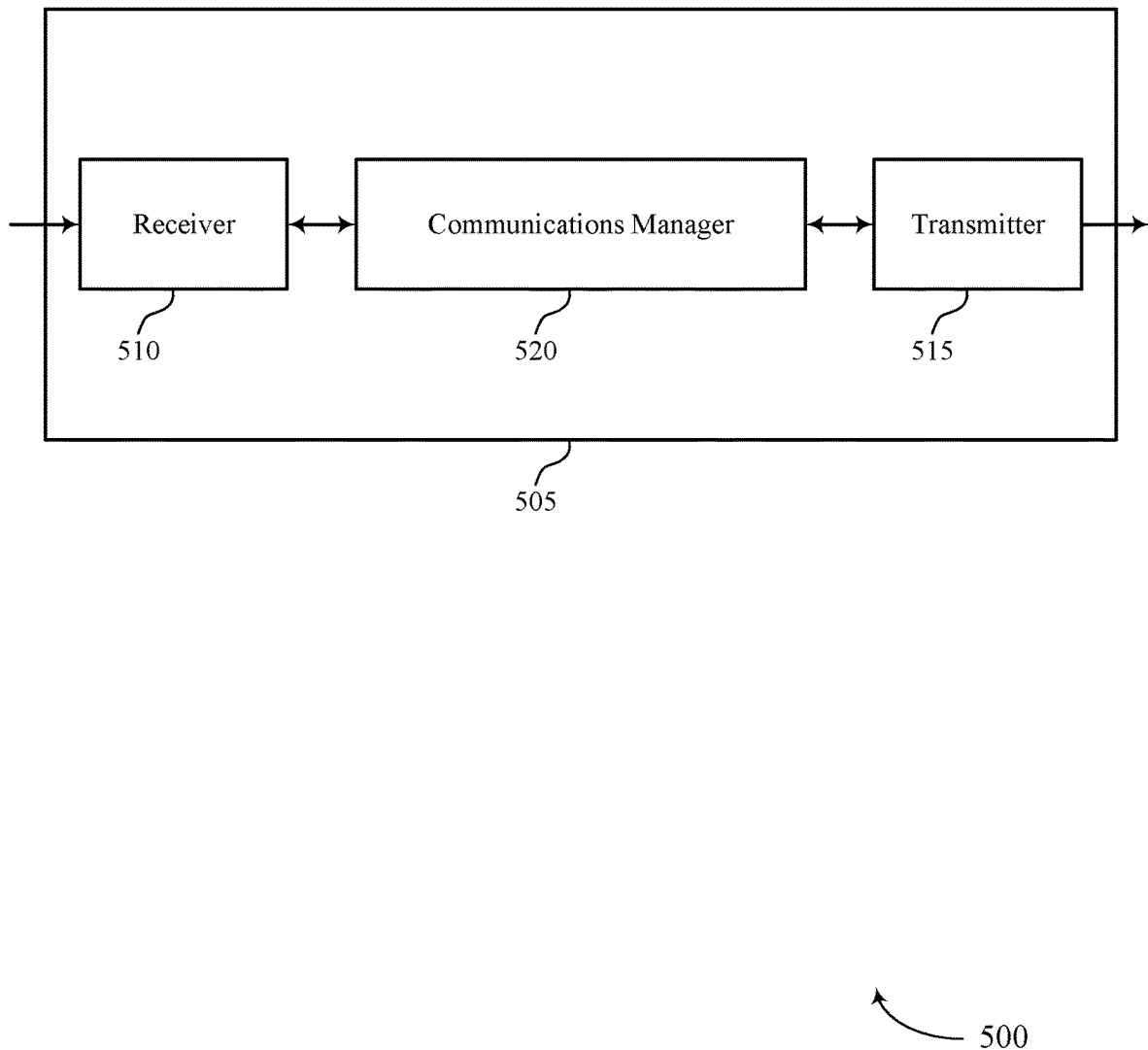
FIGS. 5 and 6 show block diagrams of devices that support signaling patterns for TDRSs in accordance with one or more aspects of the present disclosure.

FIG. 5 shows a block diagram 500 of a device 505 that supports signaling patterns for TDRS in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to signaling patterns for TDRS). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to signaling patterns for TDRS). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of signaling patterns for TDRS as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for transmitting one or more messages indicating a capability of the UE to support reception of DMRS and TDRS according to one or more signaling patterns. The communications manager 520 may be configured as or otherwise support a means for receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The communications manager 520 may be configured as or otherwise support a means for receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for more efficient utilization of communication resources, lower sensitivity to residual tracking loop errors for high frequency (e.g., Sub THz systems), and reduced processing complexity (e.g., some wide-band DMRS based channel estimations may be replaced by narrow band TDRS processing for residual STO mitigation).

Figure 6:
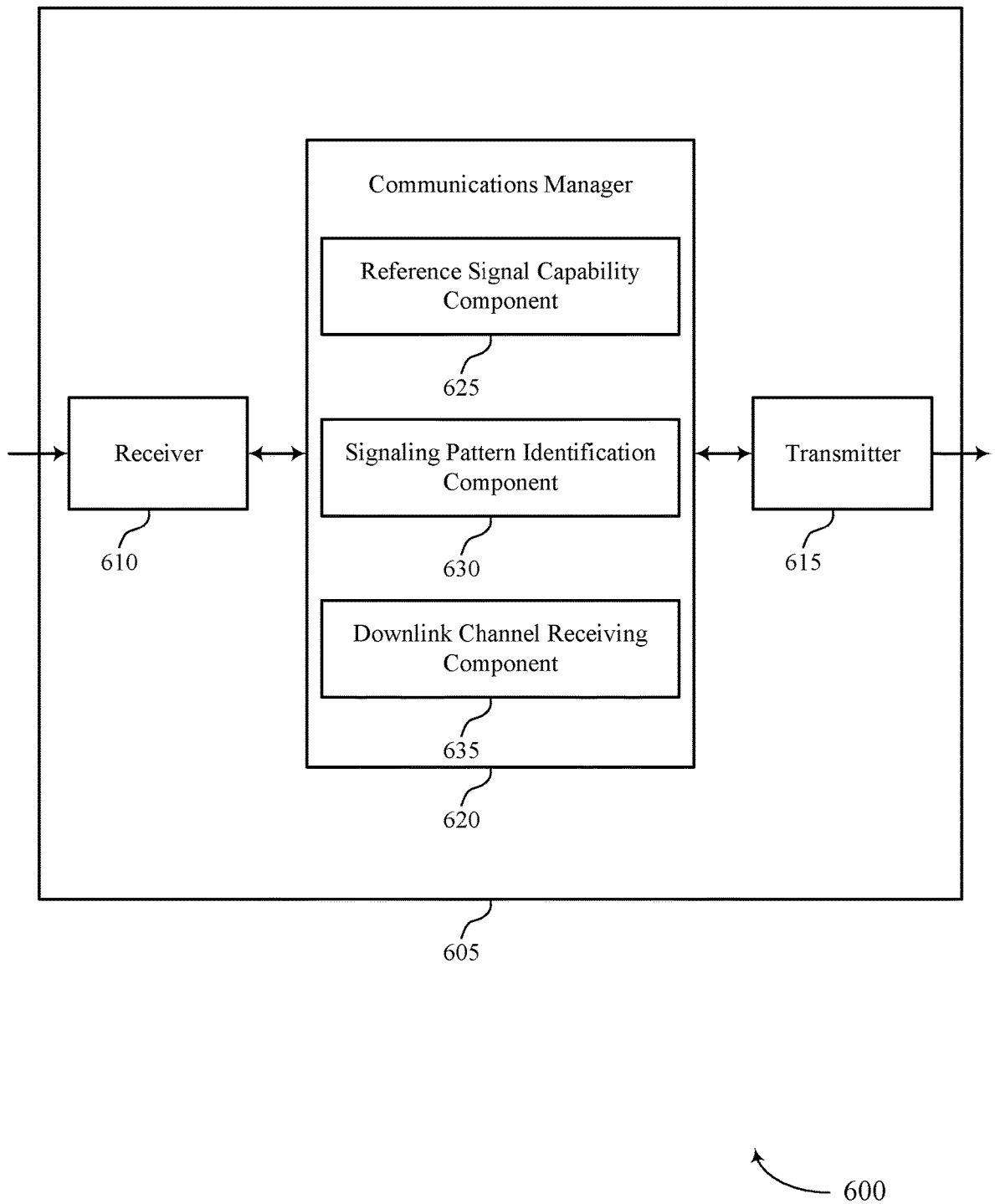

FIG. 6 shows a block diagram 600 of a device 605 that supports signaling patterns for TDRS in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signaling patterns for TDRS). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signaling patterns for TDRS). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of signaling patterns for TDRS as described herein. For example, the communications manager 620 may include a reference signal capability component 625, a signaling pattern identification component 630, a downlink channel receiving component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The reference signal capability component 625 may be configured as or otherwise support a means for transmitting one or more messages indicating a capability of the UE to support reception of DMRS and TDRS according to one or more signaling patterns. The signaling pattern identification component 630 may be configured as or otherwise support a means for receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The downlink channel receiving component 635 may be configured as or otherwise support a means for receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

Figure 7:
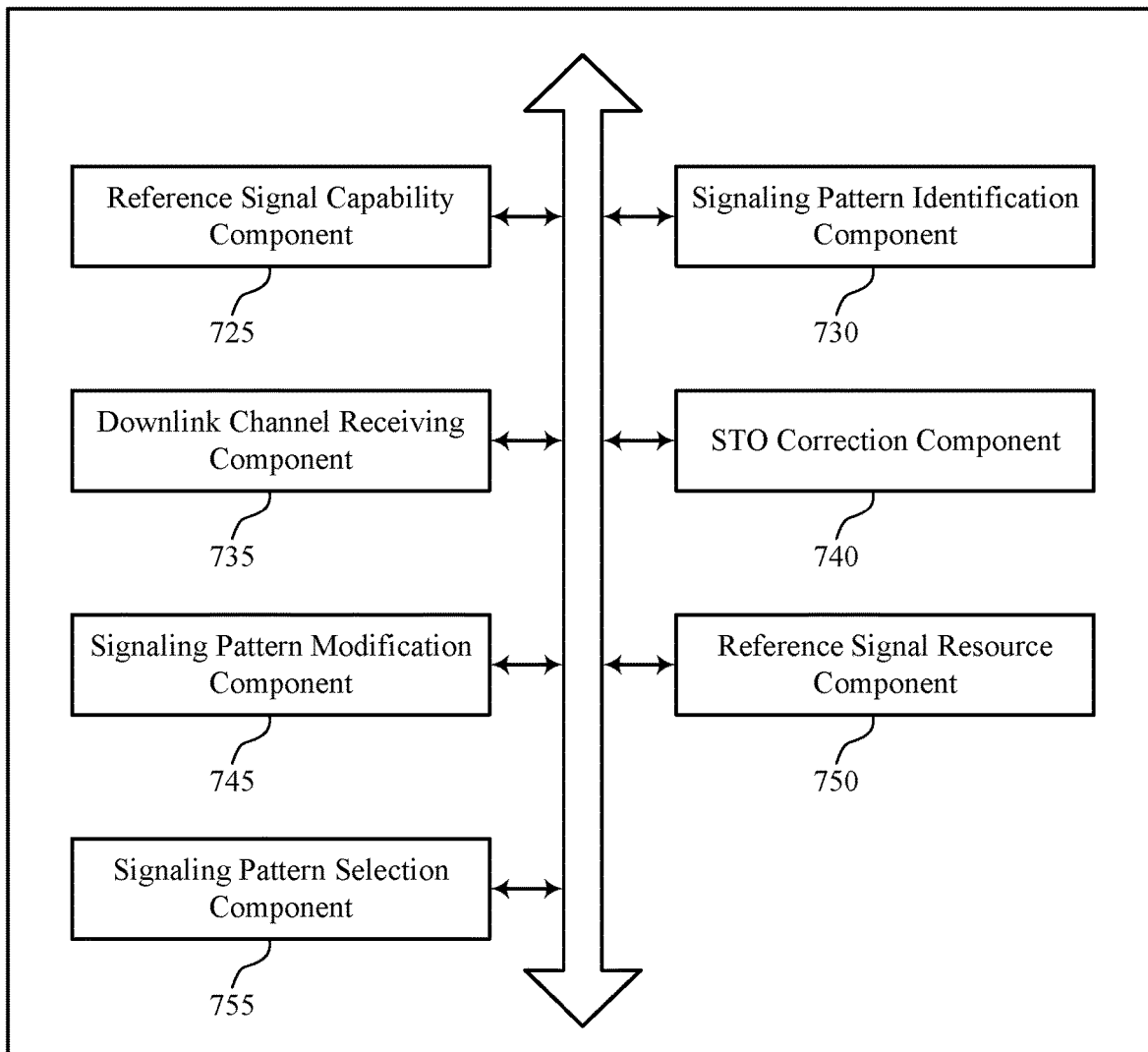
FIG. 7 shows a block diagram of a communications manager that supports signaling patterns for TDRSs in accordance with one or more aspects of the present disclosure.

FIG. 7 shows a block diagram 700 of a communications manager 720 that supports signaling patterns for TDRS in accordance with one or more aspects of the present disclosure. The communications manager 720 may be an example of aspects of a communications manager 520, a communications manager 620, or both, as described herein. The communications manager 720, or various components thereof, may be an example of means for performing various aspects of signaling patterns for TDRS as described herein. For example, the communications manager 720 may include a reference signal capability component 725, a signaling pattern identification component 730, a downlink channel receiving component 735, an STO correction component 740, a signaling pattern modification component 745, a reference signal resource component 750, a signaling pattern selection component 755, or any combination thereof. Each of these components may communicate, directly or indirectly, with one another (e.g., via one or more buses).

The communications manager 720 may support wireless communication at a UE in accordance with examples as disclosed herein. The reference signal capability component 725 may be configured as or otherwise support a means for transmitting one or more messages indicating a capability of the UE to support reception of DMRS and TDRS according to one or more signaling patterns. The signaling pattern identification component 730 may be configured as or otherwise support a means for receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The downlink channel receiving component 735 may be configured as or otherwise support a means for receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

In some examples, the first signaling pattern corresponds to a first allocation periodicity for the one or more DMRS, and the downlink channel receiving component 735 may be configured as or otherwise support a means for receiving the downlink shared channel multiplexed with the one or more TDRS in accordance with the second signaling pattern, the second signaling pattern corresponding to a second allocation periodicity that is associated with the first allocation periodicity.

In some examples, the downlink channel receiving component 735 may be configured as or otherwise support a means for receiving the one or more DMRS in accordance with the first signaling pattern and the first allocation periodicity. In some examples, the downlink channel receiving component 735 may be configured as or otherwise support a means for receiving the one or more TDRS in accordance with the second signaling pattern and the second allocation periodicity, where the second allocation periodicity is greater than the first allocation periodicity.

In some examples, the STO correction component 740 may be configured as or otherwise support a means for performing a STO correction procedure using one or more measurements associated with the one or more DMRS of the first signaling pattern, the one or more TDRS of the second signaling pattern, or both, based on an identified STO.

In some examples, to support performing the STO correction procedure, the STO correction component 740 may be configured as or otherwise support a means for performing the STO correction procedure using a measurement associated with a demodulation reference signal or a time drift reference signal that is temporally closest to the identified STO.

In some examples, to support performing the STO correction procedure, the STO correction component 740 may be configured as or otherwise support a means for performing the STO correction procedure using a measurement associated with a linear interpolation between one or more consecutive DMRS, one or more consecutive TDRS, or both.

In some examples, the signaling pattern modification component 745 may be configured as or otherwise support a means for receiving an indication that the second signaling pattern is adjusted based on the STO being greater than a STO threshold. In some examples, the downlink channel receiving component 735 may be configured as or otherwise support a means for receiving the one or more TDRS in accordance with the adjusted second signaling pattern.

In some examples, to support receiving the one or more control messages, the signaling pattern identification component 730 may be configured as or otherwise support a means for receiving a first indication of the first signaling pattern for the one or more DMRS via an RRC message. In some examples, to support receiving the one or more control messages, the signaling pattern identification component 730 may be configured as or otherwise support a means for receiving, in accordance with the RRC message, a second indication of the second signaling pattern indicating the second signaling pattern for the one or more TDRS via a DCI message.

In some examples, the signaling pattern identification component 730 may be configured as or otherwise support a means for receiving the DCI message that is coupled with the first signaling pattern via a bitmap included in the DCI message.

In some examples, to support receiving the one or more control messages, the signaling pattern identification component 730 may be configured as or otherwise support a means for receiving, via the one or more control messages, a table that indicates at least. In some examples, to support receiving the one or more control messages, the signaling pattern identification component 730 may be configured as or otherwise support a means for a first set of signaling patterns for the one or more DMRS, the first set of signaling patterns including the first signaling pattern. In some examples, to support receiving the one or more control messages, the signaling pattern identification component 730 may be configured as or otherwise support a means for a second set of signaling patterns for the one or more TDRS, the second set of signaling patterns including the second signaling pattern. In some examples, to support receiving the one or more control messages, the signaling pattern identification component 730 may be configured as or otherwise support a means for a set of MCSs associated with the first set of signaling patterns and the second set of signaling patterns.

In some examples, the signaling pattern selection component 755 may be configured as or otherwise support a means for selecting the first signaling pattern from the first set of signaling patterns. In some examples, the signaling pattern selection component 755 may be configured as or otherwise support a means for selecting the second signaling pattern from the second set of signaling patterns. In some examples, the signaling pattern selection component 755 may be configured as or otherwise support a means for selecting an MCS from the set of MCSs, where the MCS is associated with the first signaling pattern and the second signaling pattern based on the table.

In some examples, the signaling pattern modification component 745 may be configured as or otherwise support a means for applying one or more parameters associated with the first signaling pattern to obtain the second signaling pattern, the one or more parameters including a first demodulation reference signal location, one or more demodulation reference signal generation parameters, or both.

In some examples, the one or more TDRS are allocated to a single antenna port that is quasi-colocated with at least one antenna port associated with the one or more DMRS.

In some examples, the reference signal resource component 750 may be configured as or otherwise support a means for receiving a frequency domain allocation for the one or more TDRS, the frequency domain allocation indicating a first set of resources allocated for the one or more TDRS relative to a second set of resources allocated for data.

In some examples, the reference signal resource component 750 may be configured as or otherwise support a means for receiving an indication of one or more allocation bandwidth thresholds associated with the one or more TDRS, where a bandwidth associated with the one or more TDRS is based on an MCS and the one or more allocation bandwidth thresholds.

In some examples, a sequence associated with the one or more TDRS includes a low peak to average power ratio sequence.

In some examples, the first signaling pattern includes an inter-slot demodulation reference signal pattern and the second signaling pattern includes an inter-slot time drift reference signal pattern.

Figure 8:
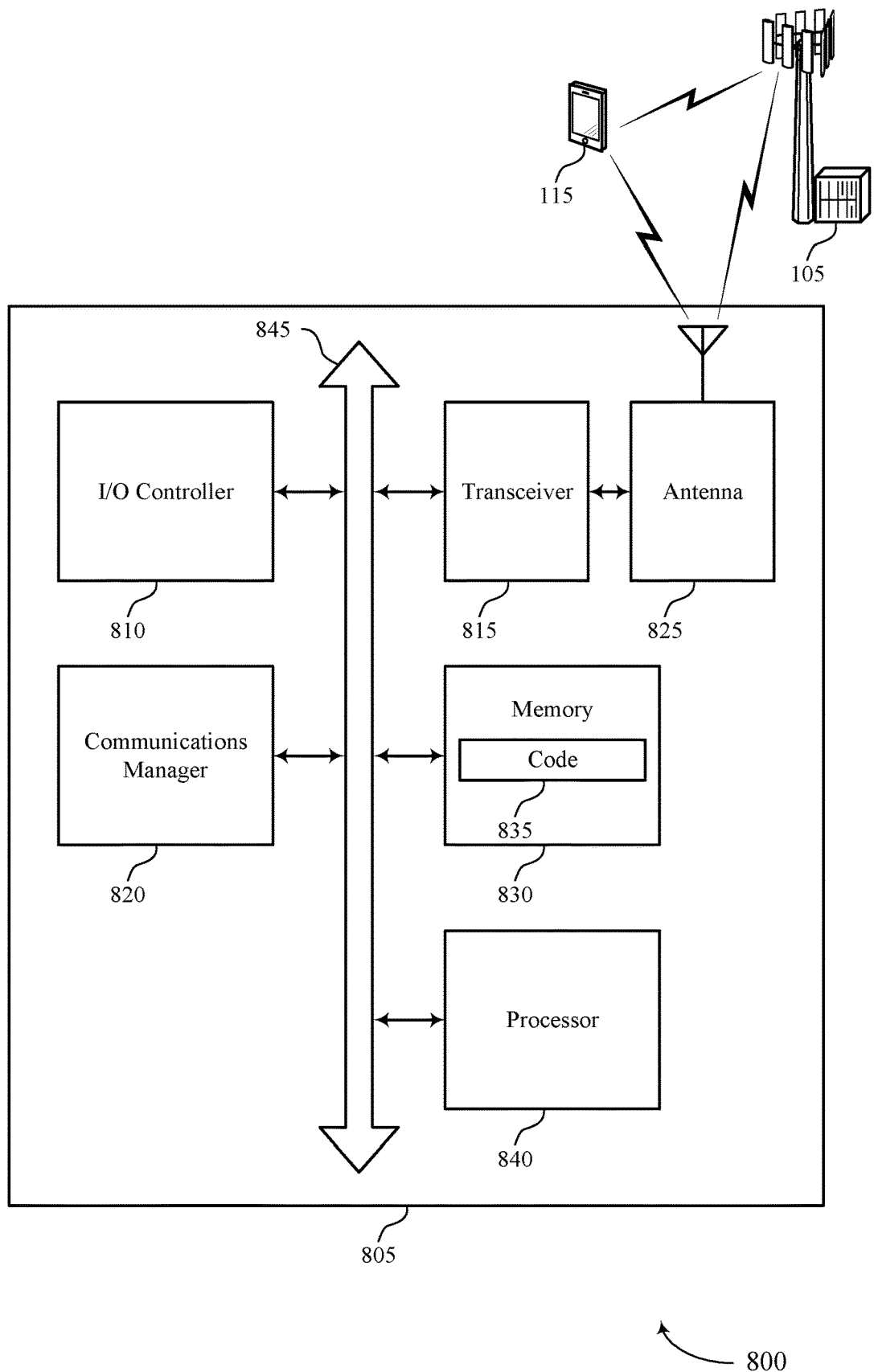
FIG. 8 shows a diagram of a system including a device that supports signaling patterns for TDRSs in accordance with one or more aspects of the present disclosure.

FIG. 8 shows a diagram of a system 800 including a device 805 that supports signaling patterns for TDRS in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting signaling patterns for TDRS). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting one or more messages indicating a capability of the UE to support reception of DMRS and TDRS according to one or more signaling patterns. The communications manager 820 may be configured as or otherwise support a means for receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The communications manager 820 may be configured as or otherwise support a means for receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

By including or configuring the communications manager 820 in accordance with examples as described herein, the device 805 may support techniques for improved communication reliability, improved user experience related to reduced processing and reduced processing complexity, more efficient utilization of communication resources, improved utilization of processing capability, reduced synchronization reference signal overhead (e.g., SSB and TRS), reduced network power consumption, reduced UE power consumption, increased data rates, reduced DMRS overhead and reduced wide-band DMRS allocation, and reduced STO error.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of signaling patterns for TDRS as described herein, or the processor 840 and the memory 830 may be otherwise configured to perform or support such operations.

Figure 9:
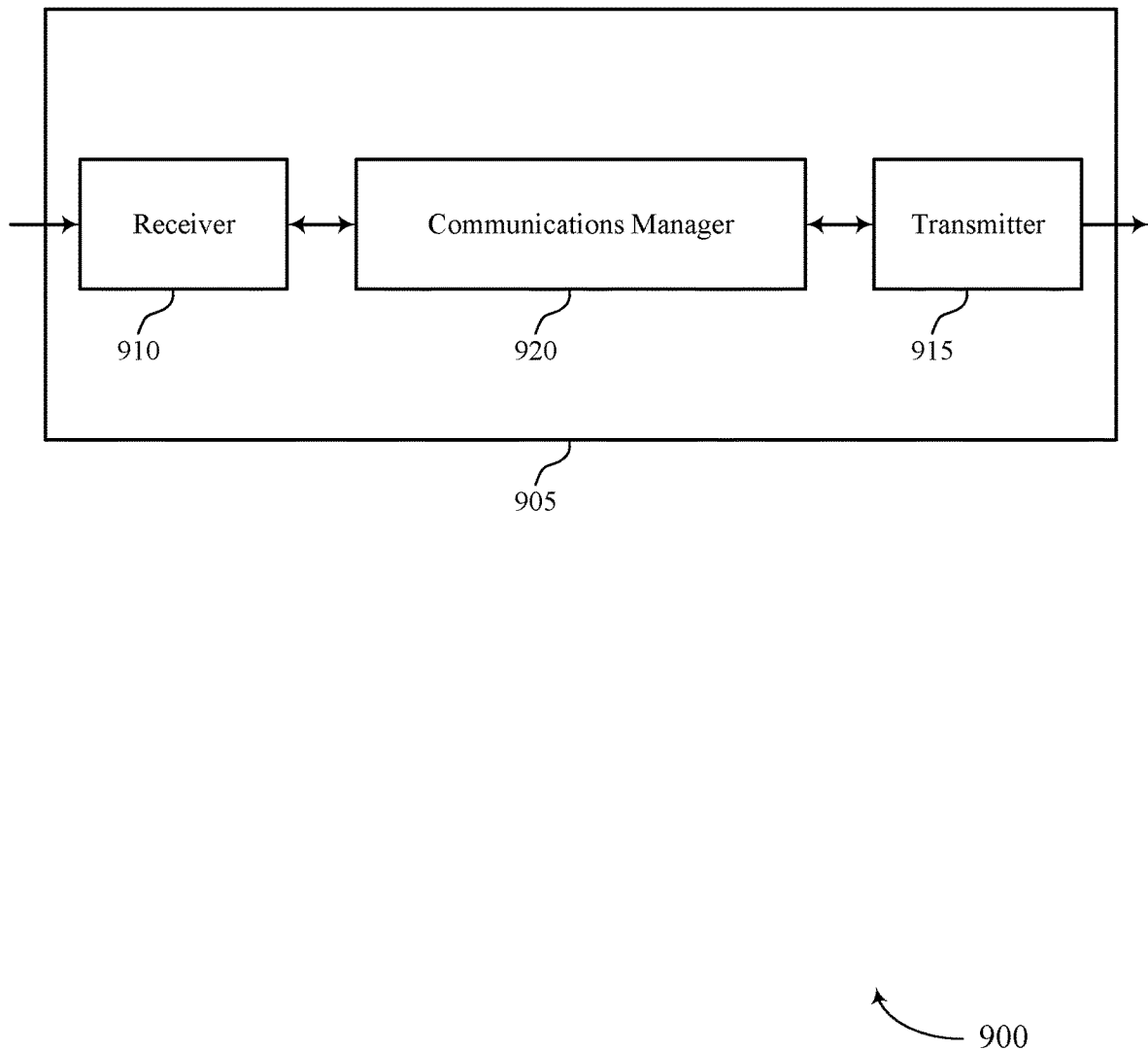
FIGS. 9 and 10 show block diagrams of devices that support signaling patterns for TDRSs in accordance with one or more aspects of the present disclosure.

FIG. 9 shows a block diagram 900 of a device 905 that supports signaling patterns for TDRS in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of signaling patterns for TDRS as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

For example, the communications manager 920 may be configured as or otherwise support a means for receiving one or more messages indicating a capability of a UE to support reception of DMRS and TDRS according to one or more signaling patterns. The communications manager 920 may be configured as or otherwise support a means for transmitting, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The communications manager 920 may be configured as or otherwise support a means for transmitting a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for more efficient utilization of communication resources, lower sensitivity to residual tracking loop errors for high frequency (e.g., Sub THz systems), and reduced processing complexity (e.g., some wide-band DMRS based channel estimations may be replaced by narrow band TDRS processing for residual STO mitigation).

Figure 10:
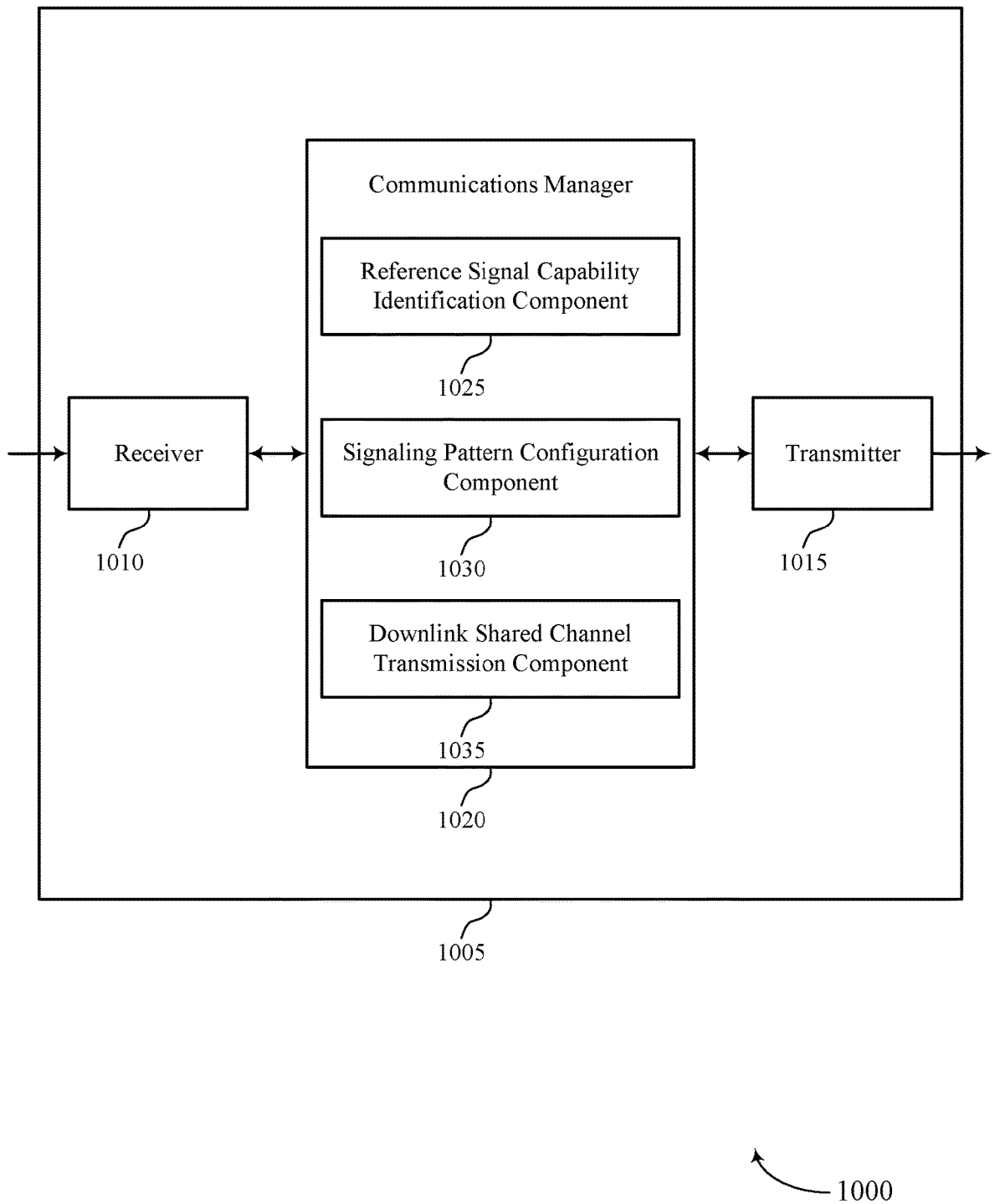

FIG. 10 shows a block diagram 1000 of a device 1005 that supports signaling patterns for TDRS in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of signaling patterns for TDRS as described herein. For example, the communications manager 1020 may include a reference signal capability identification component 1025, a signaling pattern configuration component 1030, a downlink shared channel transmission component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The reference signal capability identification component 1025 may be configured as or otherwise support a means for receiving one or more messages indicating a capability of a UE to support reception of DMRS and TDRS according to one or more signaling patterns. The signaling pattern configuration component 1030 may be configured as or otherwise support a means for transmitting, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The downlink shared channel transmission component 1035 may be configured as or otherwise support a means for transmitting a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

Figure 11:
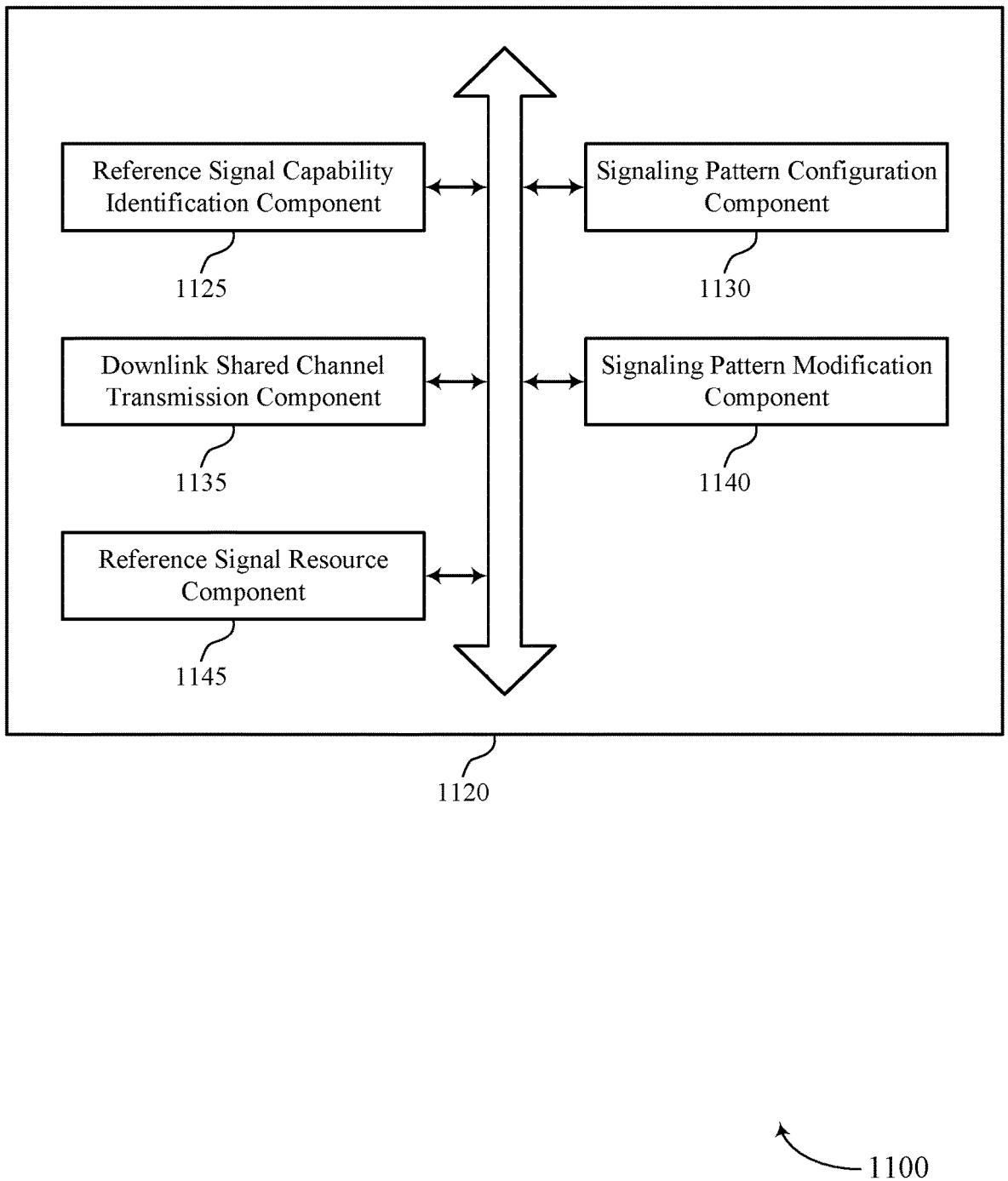
FIG. 11 shows a block diagram of a communications manager that supports signaling patterns for TDRSs in accordance with one or more aspects of the present disclosure.

FIG. 11 shows a block diagram 1100 of a communications manager 1120 that supports signaling patterns for TDRS in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of signaling patterns for TDRS as described herein. For example, the communications manager 1120 may include a reference signal capability identification component 1125, a signaling pattern configuration component 1130, a downlink shared channel transmission component 1135, a signaling pattern modification component 1140, a reference signal resource component 1145, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The reference signal capability identification component 1125 may be configured as or otherwise support a means for receiving one or more messages indicating a capability of a UE to support reception of DMRS and TDRS according to one or more signaling patterns. The signaling pattern configuration component 1130 may be configured as or otherwise support a means for transmitting, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The downlink shared channel transmission component 1135 may be configured as or otherwise support a means for transmitting a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

In some examples, the first signaling pattern corresponds to a first allocation periodicity for the one or more DMRS, and the downlink shared channel transmission component 1135 may be configured as or otherwise support a means for transmitting the downlink shared channel multiplexed with the one or more TDRS in accordance with the second signaling pattern, the second signaling pattern corresponding to a second allocation periodicity that is associated with the first allocation periodicity.

In some examples, the downlink shared channel transmission component 1135 may be configured as or otherwise support a means for transmitting the one or more DMRS in accordance with the first signaling pattern and the first allocation periodicity. In some examples, the downlink shared channel transmission component 1135 may be configured as or otherwise support a means for transmitting the one or more TDRS in accordance with the second signaling pattern and the second allocation periodicity, where the second allocation periodicity is greater than the first allocation periodicity.

In some examples, the signaling pattern modification component 1140 may be configured as or otherwise support a means for adjusting the second signaling pattern based on an identified STO being greater than a STO threshold. In some examples, the downlink shared channel transmission component 1135 may be configured as or otherwise support a means for transmitting the one or more TDRS in accordance with the adjusted second signaling pattern.

In some examples, to support transmitting the one or more control messages, the downlink shared channel transmission component 1135 may be configured as or otherwise support a means for transmitting a first indication of the first signaling pattern for the one or more DMRS via an RRC message. In some examples, to support transmitting the one or more control messages, the downlink shared channel transmission component 1135 may be configured as or otherwise support a means for transmitting, in accordance with the RRC message, a second indication of the second signaling pattern indicating the second signaling pattern for the one or more TDRS via a DCI message.

In some examples, the downlink shared channel transmission component 1135 may be configured as or otherwise support a means for transmitting the DCI message that is coupled with the first signaling pattern via a bitmap included in the DCI message.

In some examples, to support transmitting the one or more control messages, the signaling pattern configuration component 1130 may be configured as or otherwise support a means for transmitting, via the one or more control messages, a table that indicates at least. In some examples, to support transmitting the one or more control messages, the signaling pattern configuration component 1130 may be configured as or otherwise support a means for a first set of signaling patterns for the one or more DMRS, the first set of signaling patterns including the first signaling pattern. In some examples, to support transmitting the one or more control messages, the signaling pattern configuration component 1130 may be configured as or otherwise support a means for a second set of signaling patterns for the one or more TDRS, the second set of signaling patterns including the second signaling pattern. In some examples, to support transmitting the one or more control messages, the signaling pattern configuration component 1130 may be configured as or otherwise support a means for a set of MCSs associated with the first set of signaling patterns and the second set of signaling patterns.

In some examples, the one or more TDRS are allocated to a single antenna port that is quasi-colocated with at least one antenna port associated with the one or more DMRS.

In some examples, the reference signal resource component 1145 may be configured as or otherwise support a means for transmitting a frequency domain allocation for the one or more TDRS, the frequency domain allocation indicating a first set of resources allocated for the one or more TDRS relative to a second set of resources allocated for data.

In some examples, the reference signal resource component 1145 may be configured as or otherwise support a means for receiving an indication of one or more allocation bandwidth thresholds associated with the one or more TDRS, where a bandwidth associated with the one or more TDRS is based on an MCS and the one or more allocation bandwidth thresholds.

In some examples, a sequence associated with the one or more TDRS includes a low peak to average power ratio sequence.

In some examples, the first signaling pattern includes an inter-slot demodulation reference signal pattern and the second signaling pattern includes an inter-slot time drift reference signal pattern.

Figure 12:
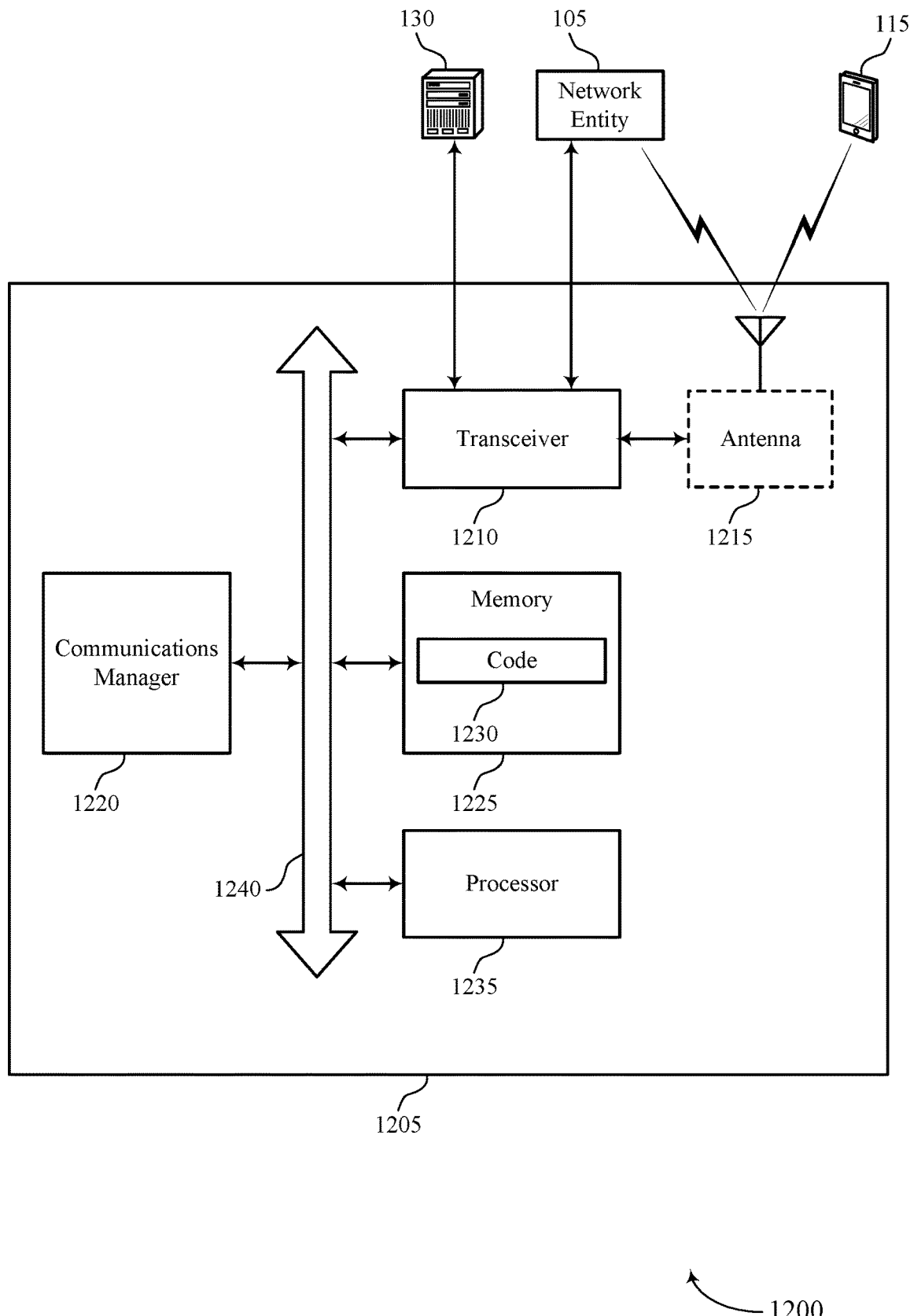
FIG. 12 shows a diagram of a system including a device that supports signaling patterns for TDRSs in accordance with one or more aspects of the present disclosure.

FIG. 12 shows a diagram of a system 1200 including a device 1205 that supports signaling patterns for TDRS in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting signaling patterns for TDRS). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

For example, the communications manager 1220 may be configured as or otherwise support a means for receiving one or more messages indicating a capability of a UE to support reception of DMRS and TDRS according to one or more signaling patterns. The communications manager 1220 may be configured as or otherwise support a means for transmitting, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The communications manager 1220 may be configured as or otherwise support a means for transmitting a downlink shared channel, the one or more DMRS, and the TDRS via the set of TTI, the downlink shared channel multiplexed with the one or more DMRS according to the first signaling pattern and multiplexed with the one or more TDRS according to the second signaling pattern.

By including or configuring the communications manager 1220 in accordance with examples as described herein, the device 1205 may support techniques for improved communication reliability, improved user experience related to reduced processing and reduced processing complexity, more efficient utilization of communication resources, improved utilization of processing capability, reduced synchronization reference signal overhead (e.g., SSB and TRS), reduced network power consumption, reduced UE power consumption, increased data rates, reduced DMRS overhead and reduced wide-band DMRS allocation, and reduced STO error.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of signaling patterns for TDRS as described herein, or the processor 1235 and the memory 1225 may be otherwise configured to perform or support such operations.

Figure 13:
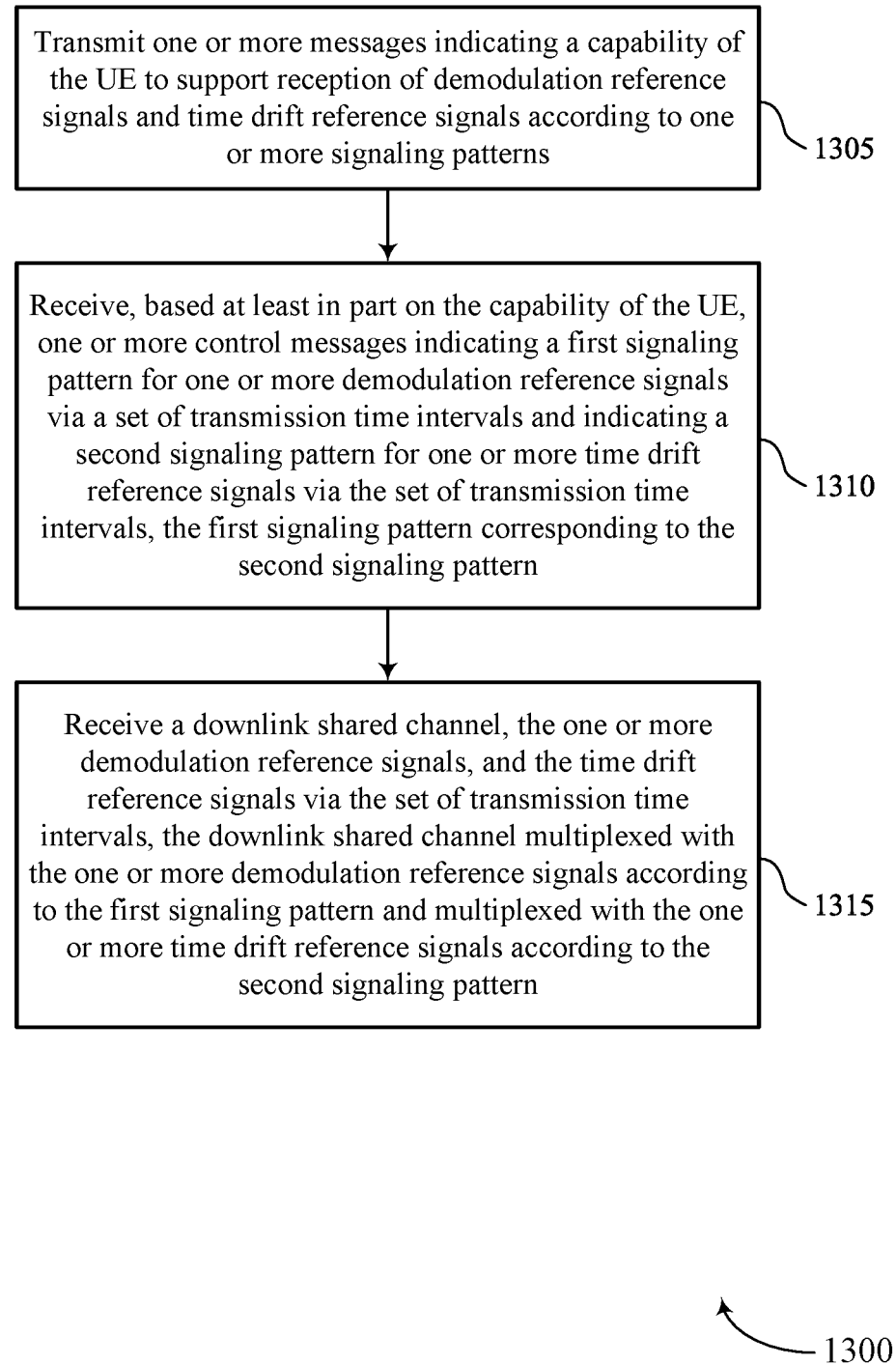
FIGS. 13 through 18 show flowcharts illustrating methods that support signaling patterns for TDRSs in accordance with one or more aspects of the present disclosure.

FIG. 13 shows a flowchart illustrating a method 1300 that supports signaling patterns for TDRS in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting one or more messages indicating a capability of the UE to support reception of DMRS and TDRS according to one or more signaling patterns. The operations of 1305 may be performed in accordance with examples as disclosed herein. In some examples, aspects of the operations of 1305 may be performed by a reference signal capability component 725 as described with reference to FIG. 7.

At 1310, the method may include receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The operations of 1310 may be performed in accordance with examples as disclosed herein. In some examples, aspects of the operations of 1310 may be performed by a signaling pattern identification component 730 as described with reference to FIG. 7.

At 1315, the method may include receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern. The operations of 1315 may be performed in accordance with examples as disclosed herein. In some examples, aspects of the operations of 1315 may be performed by a downlink channel receiving component 735 as described with reference to FIG. 7.

Figure 14:
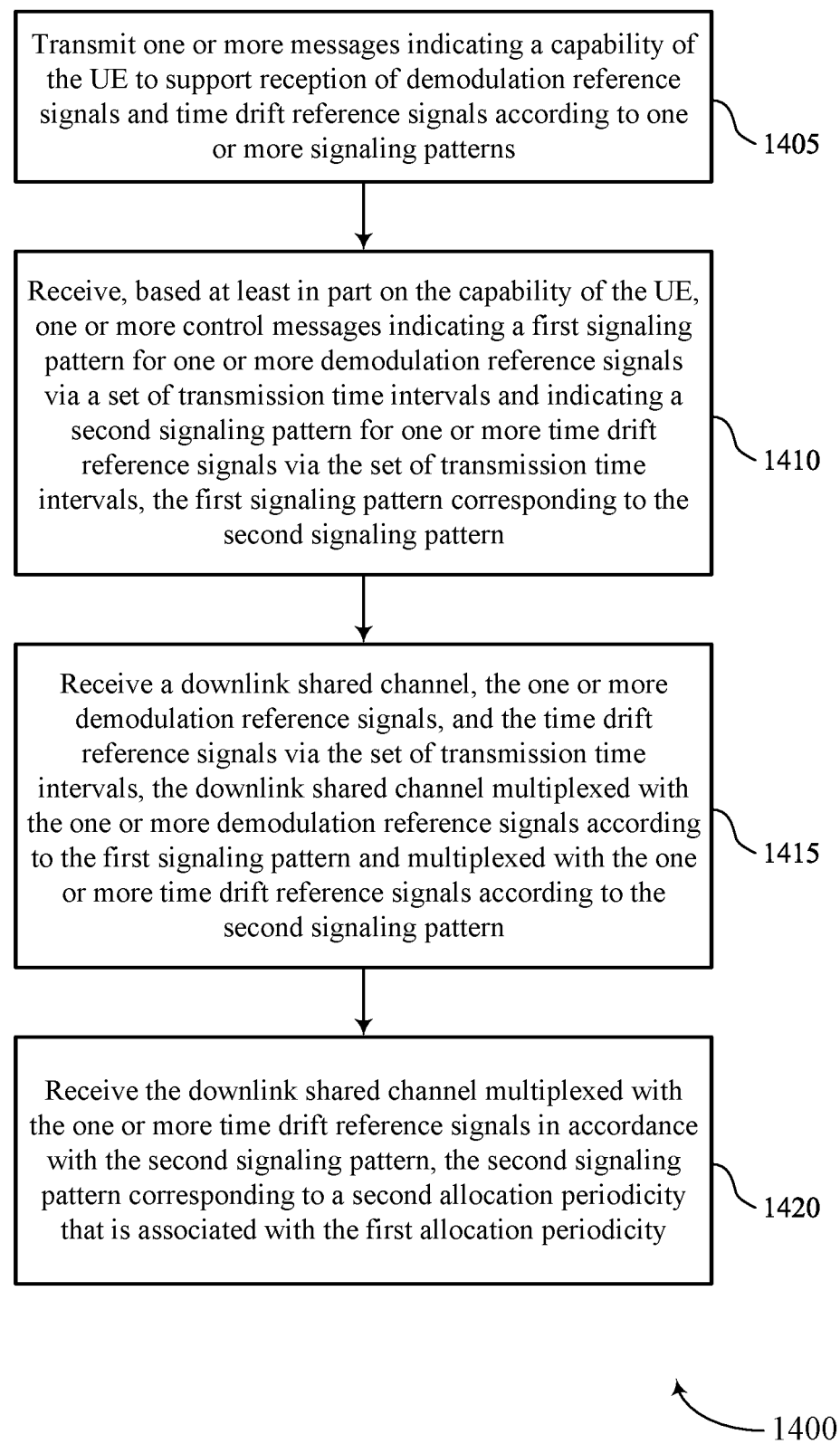

FIG. 14 shows a flowchart illustrating a method 1400 that supports signaling patterns for TDRS in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting one or more messages indicating a capability of the UE to support reception of DMRS and TDRS according to one or more signaling patterns. The operations of 1405 may be performed in accordance with examples as disclosed herein. In some examples, aspects of the operations of 1405 may be performed by a reference signal capability component 725 as described with reference to FIG. 7.

At 1410, the method may include receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The operations of 1410 may be performed in accordance with examples as disclosed herein. In some examples, aspects of the operations of 1410 may be performed by a signaling pattern identification component 730 as described with reference to FIG. 7.

At 1415, the method may include receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern. The operations of 1415 may be performed in accordance with examples as disclosed herein. In some examples, aspects of the operations of 1415 may be performed by a downlink channel receiving component 735 as described with reference to FIG. 7.

At 1420, the method may include receiving the downlink shared channel multiplexed with the one or more TDRS in accordance with the second signaling pattern, the second signaling pattern corresponding to a second allocation periodicity that is associated with the first allocation periodicity. The operations of 1420 may be performed in accordance with examples as disclosed herein. In some examples, aspects of the operations of 1420 may be performed by a downlink channel receiving component 735 as described with reference to FIG. 7.

Figure 15:
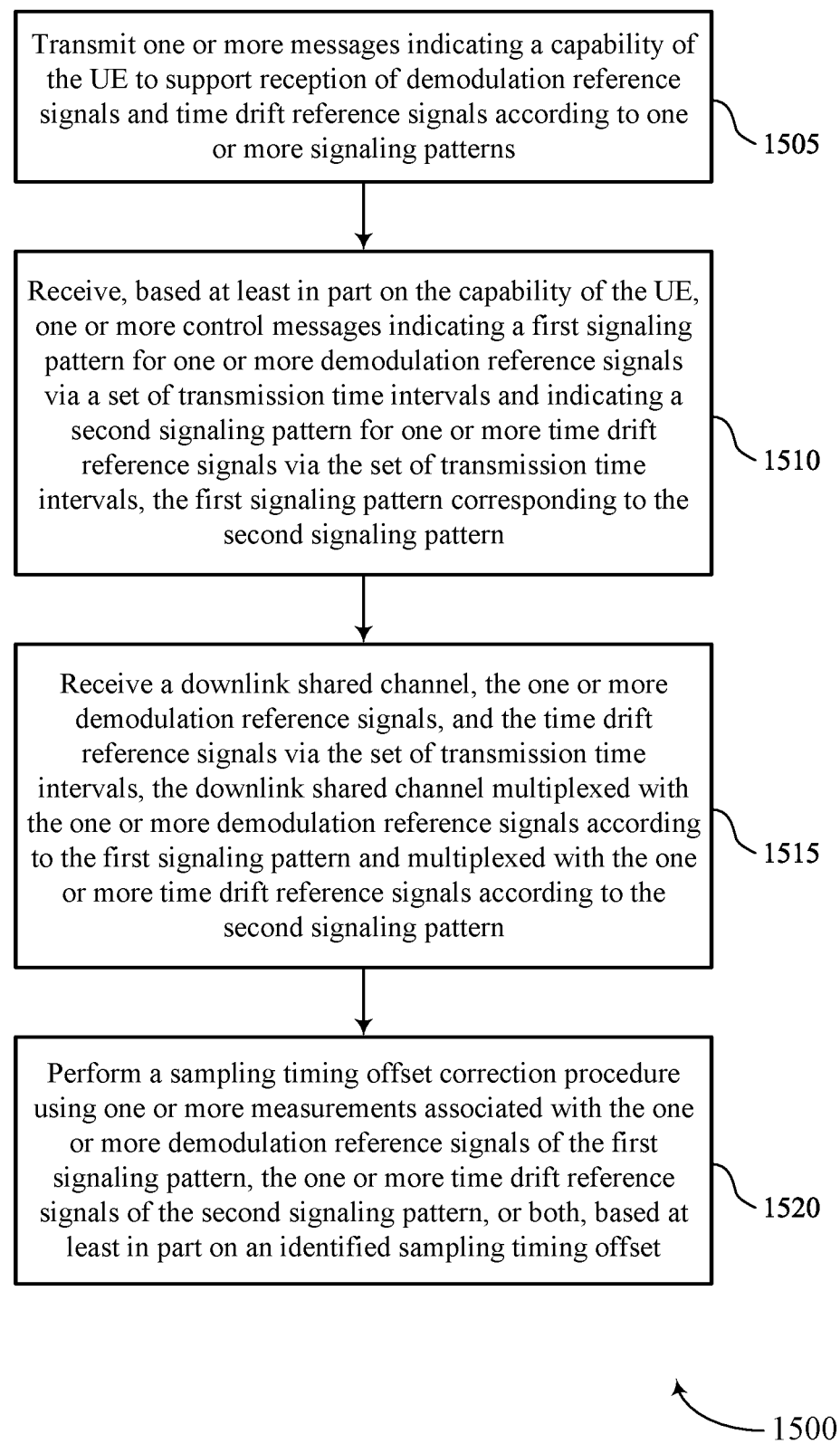

FIG. 15 shows a flowchart illustrating a method 1500 that supports signaling patterns for TDRS in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include transmitting one or more messages indicating a capability of the UE to support reception of DMRS and TDRS according to one or more signaling patterns. The operations of 1505 may be performed in accordance with examples as disclosed herein. In some examples, aspects of the operations of 1505 may be performed by a reference signal capability component 725 as described with reference to FIG. 7.

At 1510, the method may include receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The operations of 1510 may be performed in accordance with examples as disclosed herein. In some examples, aspects of the operations of 1510 may be performed by a signaling pattern identification component 730 as described with reference to FIG. 7.

At 1515, the method may include receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern. The operations of 1515 may be performed in accordance with examples as disclosed herein. In some examples, aspects of the operations of 1515 may be performed by a downlink channel receiving component 735 as described with reference to FIG. 7.

At 1520, the method may include performing a STO correction procedure using one or more measurements associated with the one or more DMRS of the first signaling pattern, the one or more TDRS of the second signaling pattern, or both, based on an identified STO. The operations of 1520 may be performed in accordance with examples as disclosed herein. In some examples, aspects of the operations of 1520 may be performed by an STO correction component 740 as described with reference to FIG. 7.

Figure 16:
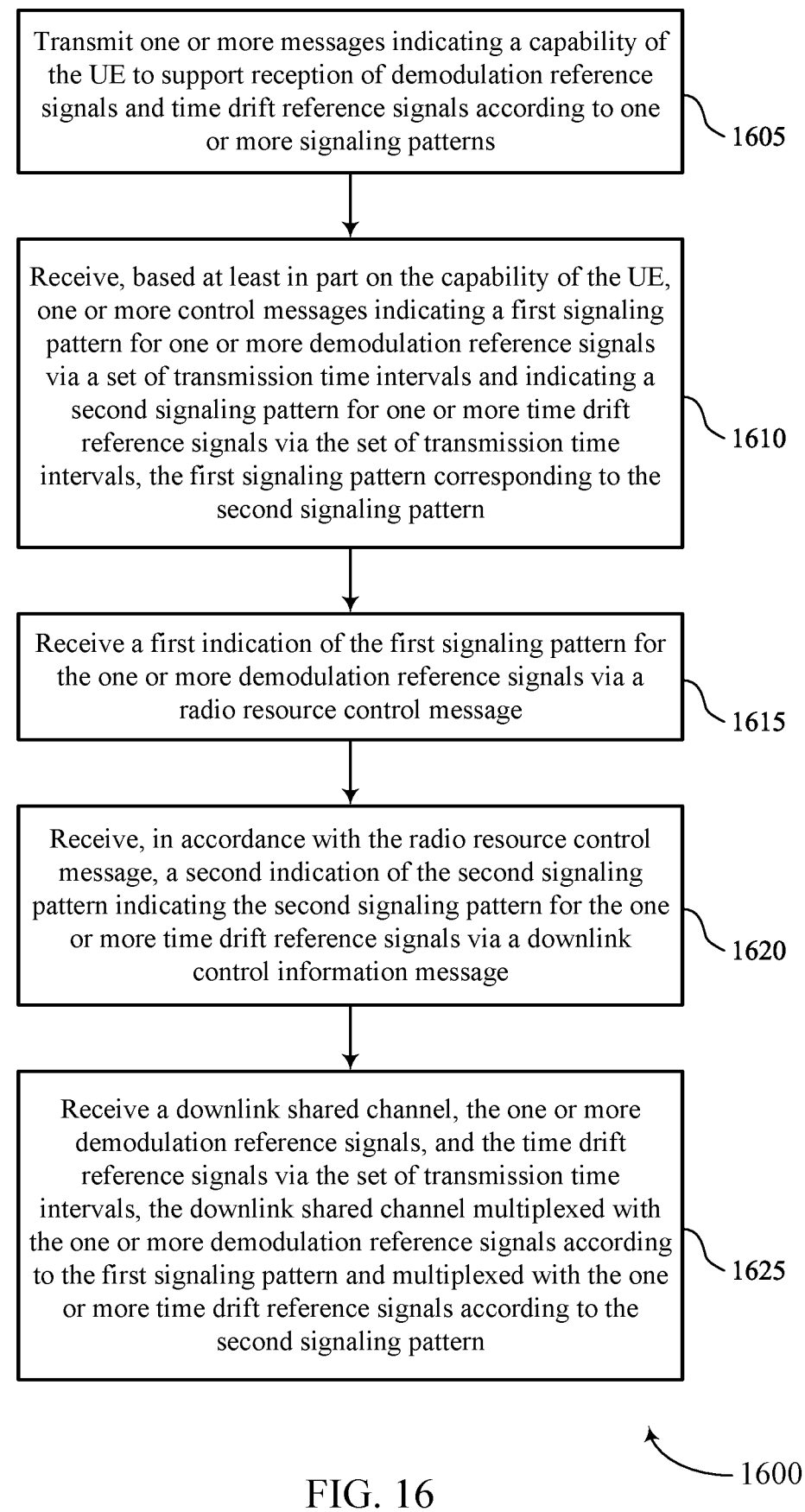

FIG. 16 shows a flowchart illustrating a method 1600 that supports signaling patterns for TDRS in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include transmitting one or more messages indicating a capability of the UE to support reception of DMRS and TDRS according to one or more signaling patterns. The operations of 1605 may be performed in accordance with examples as disclosed herein. In some examples, aspects of the operations of 1605 may be performed by a reference signal capability component 725 as described with reference to FIG. 7.

At 1610, the method may include receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The operations of 1610 may be performed in accordance with examples as disclosed herein. In some examples, aspects of the operations of 1610 may be performed by a signaling pattern identification component 730 as described with reference to FIG. 7.

At 1615, the method may include receiving a first indication of the first signaling pattern for the one or more DMRS via an RRC message. The operations of 1615 may be performed in accordance with examples as disclosed herein. In some examples, aspects of the operations of 1615 may be performed by a signaling pattern identification component 730 as described with reference to FIG. 7.

At 1620, the method may include receiving, in accordance with the RRC message, a second indication of the second signaling pattern indicating the second signaling pattern for the one or more TDRS via a DCI message. The operations of 1620 may be performed in accordance with examples as disclosed herein. In some examples, aspects of the operations of 1620 may be performed by a signaling pattern identification component 730 as described with reference to FIG. 7.

At 1625, the method may include receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern. The operations of 1625 may be performed in accordance with examples as disclosed herein. In some examples, aspects of the operations of 1625 may be performed by a downlink channel receiving component 735 as described with reference to FIG. 7.

Figure 17:
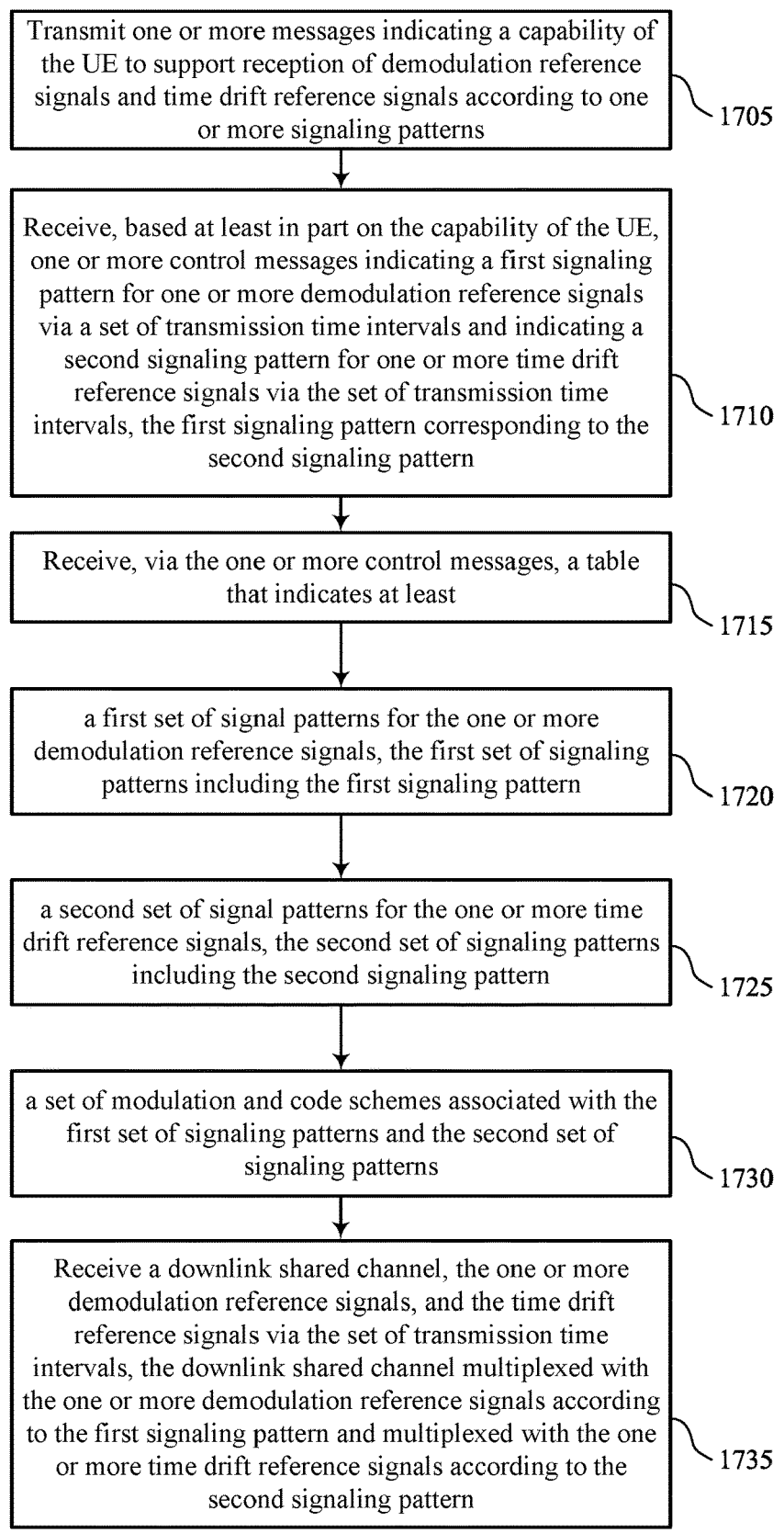

FIG. 17 shows a flowchart illustrating a method 1700 that supports signaling patterns for TDRS in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1705, the method may include transmitting one or more messages indicating a capability of the UE to support reception of DMRS and TDRS according to one or more signaling patterns. The operations of 1705 may be performed in accordance with examples as disclosed herein. In some examples, aspects of the operations of 1705 may be performed by a reference signal capability component 725 as described with reference to FIG. 7.

At 1710, the method may include receiving, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The operations of 1710 may be performed in accordance with examples as disclosed herein. In some examples, aspects of the operations of 1710 may be performed by a signaling pattern identification component 730 as described with reference to FIG. 7.

At 1715, the method may include receiving, via the one or more control messages, a table that indicates at least. The operations of 1715 may be performed in accordance with examples as disclosed herein. In some examples, aspects of the operations of 1715 may be performed by a signaling pattern identification component 730 as described with reference to FIG. 7.

At 1720, the method may include a first set of signaling patterns for the one or more DMRS, the first set of signaling patterns including the first signaling pattern. The operations of 1720 may be performed in accordance with examples as disclosed herein. In some examples, aspects of the operations of 1720 may be performed by a signaling pattern identification component 730 as described with reference to FIG. 7.

At 1725, the method may include a second set of signaling patterns for the one or more TDRS, the second set of signaling patterns including the second signaling pattern. The operations of 1725 may be performed in accordance with examples as disclosed herein. In some examples, aspects of the operations of 1725 may be performed by a signaling pattern identification component 730 as described with reference to FIG. 7.

At 1730, the method may include a set of MCSs associated with the first set of signaling patterns and the second set of signaling patterns. The operations of 1730 may be performed in accordance with examples as disclosed herein. In some examples, aspects of the operations of 1730 may be performed by a signaling pattern identification component 730 as described with reference to FIG. 7.

At 1735, the method may include receiving a downlink shared channel, the one or more DMRS, and the TDRS via the set of TTI, the downlink shared channel multiplexed with the one or more DMRS according to the first signaling pattern and multiplexed with the one or more TDRS according to the second signaling pattern. The operations of 1735 may be performed in accordance with examples as disclosed herein. In some examples, aspects of the operations of 1735 may be performed by a downlink channel receiving component 735 as described with reference to FIG. 7.

Figure 18:
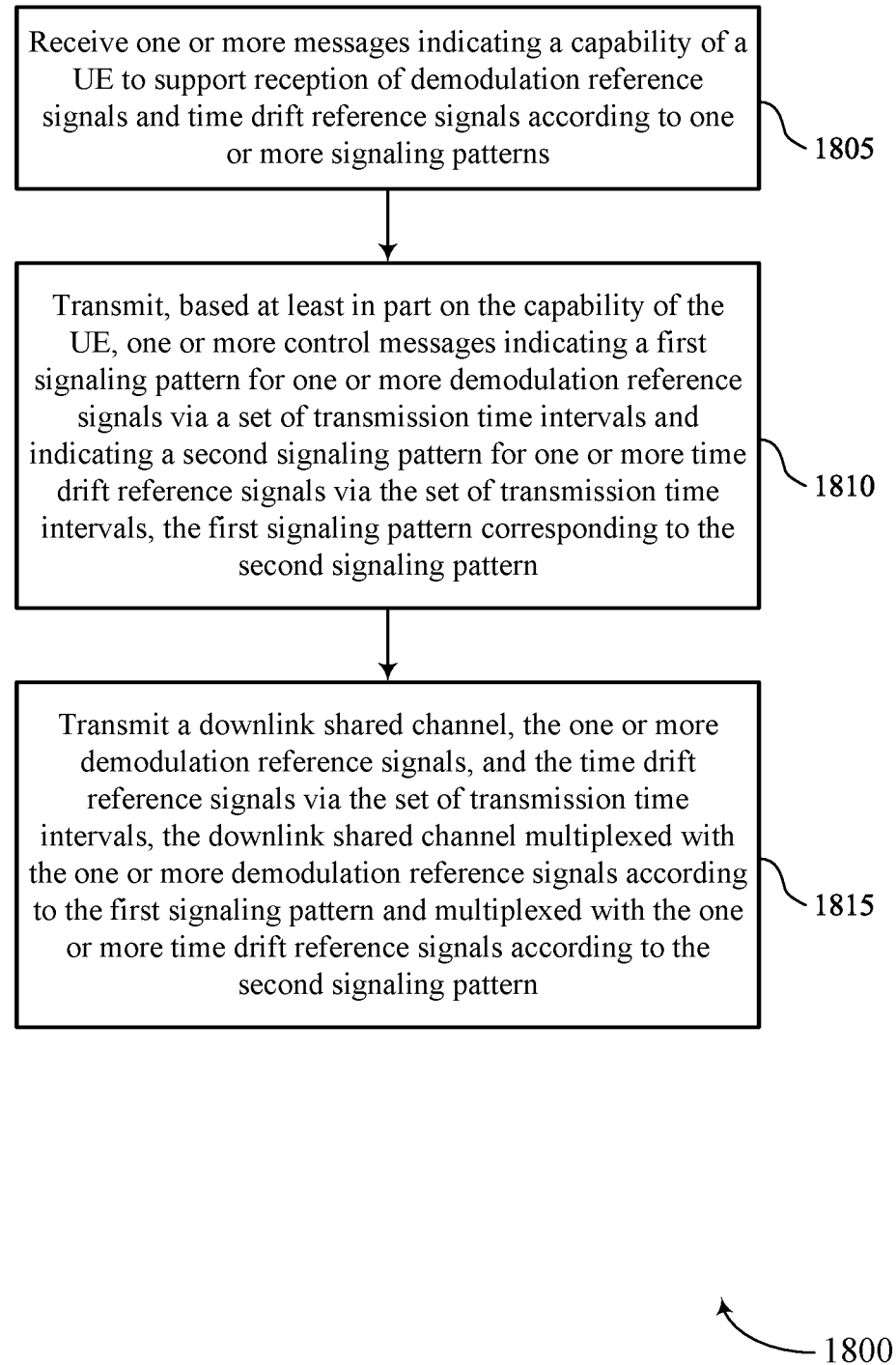

FIG. 18 shows a flowchart illustrating a method 1800 that supports signaling patterns for TDRS in accordance with one or more aspects of the present disclosure. The operations of the method 1800 may be implemented by a network entity or its components as described herein. For example, the operations of the method 1800 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1805, the method may include receiving one or more messages indicating a capability of a UE to support reception of DMRS and TDRS according to one or more signaling patterns. The operations of 1805 may be performed in accordance with examples as disclosed herein. In some examples, aspects of the operations of 1805 may be performed by a reference signal capability identification component 1125 as described with reference to FIG. 11.

At 1810, the method may include transmitting, based on the capability of the UE, one or more control messages indicating a first signaling pattern for one or more DMRS via a set of TTI and indicating a second signaling pattern for one or more TDRS via the set of TTI, the first signaling pattern corresponding to the second signaling pattern. The operations of 1810 may be performed in accordance with examples as disclosed herein. In some examples, aspects of the operations of 1810 may be performed by a signaling pattern configuration component 1130 as described with reference to FIG. 11.

At 1815, the method may include transmitting a downlink shared channel, the one or more DMRS, and the TDRS via the set of TTI, the downlink shared channel multiplexed with the one or more DMRS according to the first signaling pattern and multiplexed with the one or more TDRS according to the second signaling pattern. The operations of 1815 may be performed in accordance with examples as disclosed herein. In some examples, aspects of the operations of 1815 may be performed by a downlink shared channel transmission component 1135 as described with reference to FIG. 11.

The following provides an overview of aspects of the present disclosure:

Aspect 1: A method for wireless communication at a UE, comprising: transmitting one or more messages indicating a capability of the UE to support reception of DMRSs and TDRSs according to one or more signaling patterns; receiving, based at least in part on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern; and receiving a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

Aspect 2: The method of aspect 1, wherein the first signaling pattern corresponds to a first allocation periodicity for the one or more DMRSs, the method further comprising: receiving the downlink shared channel multiplexed with the one or more TDRSs in accordance with the second signaling pattern, the second signaling pattern corresponding to a second allocation periodicity that is associated with the first allocation periodicity.

Aspect 3: The method of aspect 2, further comprising: receiving the one or more DMRSs in accordance with the first signaling pattern and the first allocation periodicity; and receiving the one or more TDRSs in accordance with the second signaling pattern and the second allocation periodicity, wherein the second allocation periodicity is greater than the first allocation periodicity.

Aspect 4: The method of any of aspects 1 through 3, further comprising: performing a STO correction procedure using one or more measurements associated with the one or more DMRSs of the first signaling pattern, the one or more TDRSs of the second signaling pattern, or both, based at least in part on an identified STO.

Aspect 5: The method of aspect 4, wherein performing the STO correction procedure comprises: performing the STO correction procedure using a measurement associated with a DMRS or a TDRS that is temporally closest to the identified STO.

Aspect 6: The method of any of aspects 4 through 5, wherein performing the STO correction procedure comprises: performing the STO correction procedure using a measurement associated with a linear interpolation between one or more consecutive DMRSs, one or more consecutive TDRSs, or both.

Aspect 7: The method of any of aspects 4 through 6, further comprising: receiving an indication that the second signaling pattern is adjusted based at least in part on the STO being greater than a STO threshold; and receiving the one or more TDRSs in accordance with the adjusted second signaling pattern.

Aspect 8: The method of any of aspects 1 through 7, wherein receiving the one or more control messages comprises: receiving a first indication of the first signaling pattern for the one or more DMRSs via an RRC message; and receiving, in accordance with the RRC message, a second indication of the second signaling pattern indicating the second signaling pattern for the one or more TDRSs via a DCI message.

Aspect 9: The method of aspect 8, further comprising: receiving the DCI message that is coupled with the first signaling pattern via a bitmap included in the DCI message.

Aspect 10: The method of any of aspects 1 through 9, wherein receiving the one or more control messages further comprises: receiving, via the one or more control messages, a table that indicates at least: a first set of signaling patterns for the one or more DMRSs, the first set of signaling patterns including the first signaling pattern; a second set of signaling patterns for the one or more TDRSs, the second set of signaling patterns including the second signaling pattern; and a set of MCSs associated with the first set of signaling patterns and the second set of signaling patterns.

Aspect 11: The method of aspect 10, further comprising: selecting the first signaling pattern from the first set of signaling patterns; selecting the second signaling pattern from the second set of signaling patterns; and selecting a MCS from the set of MCSs, wherein the MCS is associated with the first signaling pattern and the second signaling pattern based at least in part on the table.

Aspect 12: The method of any of aspects 1 through 11, further comprising: applying one or more parameters associated with the first signaling pattern to obtain the second signaling pattern, the one or more parameters comprising a first DMRS location, one or more DMRS generation parameters, or both.

Aspect 13: The method of any of aspects 1 through 12, wherein the one or more TDRSs are allocated to a single antenna port that is quasi-colocated with at least one antenna port associated with the one or more DMRSs.

Aspect 14: The method of any of aspects 1 through 13, further comprising: receiving a frequency domain allocation for the one or more TDRSs, the frequency domain allocation indicating a first set of resources allocated for the one or more TDRSs relative to a second set of resources allocated for data.

Aspect 15: The method of any of aspects 1 through 14, further comprising: receiving an indication of one or more allocation bandwidth thresholds associated with the one or more TDRSs, wherein a bandwidth associated with the one or more TDRSs is based at least in part on a MCS and the one or more allocation bandwidth thresholds.

Aspect 16: The method of any of aspects 1 through 15, wherein a sequence associated with the one or more TDRSs comprises a low PAPR sequence.

Aspect 17: The method of any of aspects 1 through 16, wherein the first signaling pattern comprises an inter-slot DMRS pattern and the second signaling pattern comprises an inter-slot TDRS pattern.

Aspect 18: A method for wireless communication at a network entity comprising: receiving one or more messages indicating a capability of a UE to support reception of DMRSs and TDRSs according to one or more signaling patterns; transmitting, based at least in part on the capability of the UE, one or more control messages indicating a first signaling pattern for one or more DMRSs via a set of transmission time intervals and indicating a second signaling pattern for one or more TDRSs via the set of transmission time intervals, the first signaling pattern corresponding to the second signaling pattern; and transmitting a downlink shared channel, the one or more DMRSs, and the TDRSs via the set of transmission time intervals, the downlink shared channel multiplexed with the one or more DMRSs according to the first signaling pattern and multiplexed with the one or more TDRSs according to the second signaling pattern.

Aspect 19: The method of aspect 18, wherein the first signaling pattern corresponds to a first allocation periodicity for the one or more DMRSs, the method further comprising: transmitting the downlink shared channel multiplexed with the one or more TDRSs in accordance with the second signaling pattern, the second signaling pattern corresponding to a second allocation periodicity that is associated with the first allocation periodicity.

Aspect 20: The method of aspect 19, further comprising: transmitting the one or more DMRSs in accordance with the first signaling pattern and the first allocation periodicity; and transmitting the one or more TDRSs in accordance with the second signaling pattern and the second allocation periodicity, wherein the second allocation periodicity is greater than the first allocation periodicity.

Aspect 21: The method of any of aspects 18 through 20, further comprising: adjusting the second signaling pattern based at least in part on an identified STO being greater than a STO threshold; and transmitting the one or more TDRSs in accordance with the adjusted second signaling pattern.

Aspect 22: The method of any of aspects 18 through 21, wherein transmitting the one or more control messages comprises: transmitting a first indication of the first signaling pattern for the one or more DMRSs via an RRC message; and transmitting, in accordance with the RRC message, a second indication of the second signaling pattern indicating the second signaling pattern for the one or more TDRSs via a DCI message.

Aspect 23: The method of aspect 22, further comprising: transmitting the DCI message that is coupled with the first signaling pattern via a bitmap included in the DCI message.

Aspect 24: The method of any of aspects 18 through 23, wherein transmitting the one or more control messages comprises: transmitting, via the one or more control messages, a table that indicates at least: a first set of signaling patterns for the one or more DMRSs, the first set of signaling patterns including the first signaling pattern; a second set of signaling patterns for the one or more TDRSs, the second set of signaling patterns including the second signaling pattern; and a set of MCSs associated with the first set of signaling patterns and the second set of signaling patterns.

Aspect 25: The method of any of aspects 18 through 24, wherein the one or more TDRSs are allocated to a single antenna port that is quasi-colocated with at least one antenna port associated with the one or more DMRSs.

Aspect 26: The method of any of aspects 18 through 25, further comprising: transmitting a frequency domain allocation for the one or more TDRSs, the frequency domain allocation indicating a first set of resources allocated for the one or more TDRSs relative to a second set of resources allocated for data.

Aspect 27: The method of any of aspects 18 through 26, further comprising: receiving an indication of one or more allocation bandwidth thresholds associated with the one or more TDRSs, wherein a bandwidth associated with the one or more TDRSs is based at least in part on a MCS and the one or more allocation bandwidth thresholds.

Aspect 28: The method of any of aspects 18 through 27, wherein a sequence associated with the one or more TDRSs comprises a low PAPR sequence.

Aspect 29: The method of any of aspects 18 through 28, wherein the first signaling pattern comprises an inter-slot DMRS pattern and the second signaling pattern comprises an inter-slot TDRS pattern.

Aspect 30: An apparatus for wireless communication at a UE, comprising a processor; memory coupled with the processor; and instructions stored in the memory and executable by the processor to cause the apparatus to perform a method of any of aspects 1 through 17.

Aspect 31: An apparatus for wireless communication at a UE, comprising at least one means for performing a method of any of aspects 1 through 17.

Aspect 32: A non-transitory computer-readable medium storing code for wireless communication at a UE, the code comprising instructions executable by a processor to perform a method of any of aspects 1 through 17.

Aspect 33: An apparatus comprising a processor; memory coupled with the processor; and instructions stored in the memory and executable by the processor to cause the apparatus to perform a method of any of aspects 18 through 29.

Aspect 34: An apparatus comprising at least one means for performing a method of any of aspects 18 through 29.

Aspect 35: A non-transitory computer-readable medium storing code the code comprising instructions executable by a processor to perform a method of any of aspects 18 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers.

Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    transmitting one or more messages indicating a capability of the UE to support reception of demodulation reference signals and time drift reference signals according to one or more signaling patterns;
    receiving, based at least in part on the capability of the UE, one or more control messages indicating a first signaling pattern for one or more demodulation reference signals via a set of transmission time intervals, the first signaling pattern corresponding to a first allocation periodicity for the one or more demodulation reference signals, and indicating a second signaling pattern for one or more time drift reference signals via the set of transmission time intervals, the second signaling pattern corresponding to a second allocation periodicity for the one or more time drift reference signals that is associated with the first allocation periodicity, wherein the first signaling pattern corresponds to the second signaling pattern; and
    receiving a downlink shared channel, the one or more demodulation reference signals, and the time drift reference signals via the set of transmission time intervals, the downlink shared channel multiplexed with the one or more demodulation reference signals according to the first signaling pattern and multiplexed with the one or more time drift reference signals according to the second signaling pattern.

2. The method of claim 1, further comprising:
    receiving the one or more demodulation reference signals in accordance with the first signaling pattern and the first allocation periodicity; and
    receiving the one or more time drift reference signals in accordance with the second signaling pattern and the second allocation periodicity, wherein the second allocation periodicity is greater than the first allocation periodicity.

3. The method of claim 1, further comprising:
    performing a sampling timing offset correction procedure using one or more measurements associated with the one or more demodulation reference signals of the first signaling pattern, the one or more time drift reference signals of the second signaling pattern, or both, based at least in part on an identified sampling timing offset.

4. The method of claim 3, wherein performing the sampling timing offset correction procedure comprises:
    performing the sampling timing offset correction procedure using a measurement associated with a demodulation reference signal or a time drift reference signal that is temporally closest to the identified sampling timing offset.

5. The method of claim 3, wherein performing the sampling timing offset correction procedure comprises:
    performing the sampling timing offset correction procedure using a measurement associated with a linear interpolation between one or more consecutive demodulation reference signals, one or more consecutive time drift reference signals, or both.

6. The method of claim 3, further comprising:
    receiving an indication that the second signaling pattern is adjusted based at least in part on the identified sampling timing offset being greater than a sampling timing offset threshold; and
    receiving the one or more time drift reference signals in accordance with an adjusted second signaling pattern.

7. The method of claim 1, wherein receiving the one or more control messages comprises:
    receiving a first indication of the first signaling pattern for the one or more demodulation reference signals via a radio resource control message; and
    receiving, in accordance with the radio resource control message, a second indication of the second signaling pattern indicating the second signaling pattern for the one or more time drift reference signals via a downlink control information message.

8. The method of claim 7, further comprising:
receiving the downlink control information message that is coupled with the first signaling pattern via a bitmap included in the downlink control information message.

9. The method of claim 1, wherein receiving the one or more control messages further comprises:
receiving, via the one or more control messages, a table that indicates at least:
a first set of signaling patterns for the one or more demodulation reference signals, the first set of signaling patterns including the first signaling pattern;
a second set of signaling patterns for the one or more time drift reference signals, the second set of signaling patterns including the second signaling pattern; and
a set of modulation and coding schemes associated with the first set of signaling patterns and the second set of signaling patterns.

10. The method of claim 9, further comprising:
selecting the first signaling pattern from the first set of signaling patterns;
selecting the second signaling pattern from the second set of signaling patterns; and
selecting an modulation and coding scheme from the set of modulation and coding schemes, wherein the modulation and coding scheme is associated with the first signaling pattern and the second signaling pattern based at least in part on the table.

11. The method of claim 1, further comprising:
applying one or more parameters associated with the first signaling pattern to obtain the second signaling pattern, the one or more parameters comprising a first demodulation reference signal location, one or more demodulation reference signal generation parameters, or both.

12. The method of claim 1, wherein the one or more time drift reference signals are allocated to a single antenna port that is quasi-colocated with at least one antenna port associated with the one or more demodulation reference signals.

13. The method of claim 1, further comprising:
receiving a frequency domain allocation for the one or more time drift reference signals, the frequency domain allocation indicating a first set of resources allocated for the one or more time drift reference signals relative to a second set of resources allocated for data.

14. The method of claim 1, further comprising:
receiving an indication of one or more allocation bandwidth thresholds associated with the one or more time drift reference signals, wherein a bandwidth associated with the one or more time drift reference signals is based at least in part on an modulation and coding scheme and the one or more allocation bandwidth thresholds.

15. The method of claim 1, wherein a sequence associated with the one or more time drift reference signals comprises a low peak to average power ratio sequence.

16. The method of claim 1, wherein the first signaling pattern comprises an inter-slot demodulation reference signal pattern and the second signaling pattern comprises an inter-slot time drift reference signal pattern.

17. A method for wireless communication at a network entity comprising:
receiving one or more messages indicating a capability of a user equipment (UE) to support reception of demodulation reference signals and time drift reference signals according to one or more signaling patterns;
transmitting, based at least in part on the capability of the UE, one or more control messages indicating a first signaling pattern for one or more demodulation reference signals via a set of transmission time intervals, the first signaling pattern corresponding to a first allocation periodicity for the one or more demodulation reference signals, and indicating a second signaling pattern for one or more time drift reference signals via the set of transmission time intervals, the second signaling pattern corresponding to a second allocation periodicity that is associated with the first allocation periodicity, wherein the first signaling pattern corresponds to the second signaling pattern; and
transmitting a downlink shared channel, the one or more demodulation reference signals, and the time drift reference signals via the set of transmission time intervals, the downlink shared channel multiplexed with the one or more demodulation reference signals according to the first signaling pattern and multiplexed with the one or more time drift reference signals according to the second signaling pattern.

18. The method of claim 17, wherein the first signaling pattern corresponds to a first allocation periodicity for the one or more demodulation reference signals, the method further comprising:
transmitting the downlink shared channel multiplexed with the one or more time drift reference signals in accordance with the second signaling pattern, the second signaling pattern corresponding to a second allocation periodicity that is associated with the first allocation periodicity.

19. The method of claim 18, further comprising:
transmitting the one or more demodulation reference signals in accordance with the first signaling pattern and the first allocation periodicity; and
transmitting the one or more time drift reference signals in accordance with the second signaling pattern and the second allocation periodicity, wherein the second allocation periodicity is greater than the first allocation periodicity.

20. The method of claim 17, further comprising:
adjusting the second signaling pattern based at least in part on an identified sampling timing offset being greater than a sampling timing offset threshold; and
transmitting the one or more time drift reference signals in accordance with an adjusted second signaling pattern.

21. The method of claim 17, wherein transmitting the one or more control messages comprises:
transmitting a first indication of the first signaling pattern for the one or more demodulation reference signals via a radio resource control message; and
transmitting, in accordance with the radio resource control message, a second indication of the second signaling pattern indicating the second signaling pattern for the one or more time drift reference signals via a downlink control information message.

22. The method of claim 21, further comprising:
transmitting the downlink control information message that is coupled with the first signaling pattern via a bitmap included in the downlink control information message.

23. The method of claim 17, wherein transmitting the one or more control messages comprises:
transmitting, via the one or more control messages, a table that indicates at least:
a first set of signaling patterns for the one or more demodulation reference signals, the first set of signaling patterns including the first signaling pattern;

a second set of signaling patterns for the one or more time drift reference signals, the second set of signaling patterns including the second signaling pattern; and a set of modulation and coding schemes associated with the first set of signaling patterns and the second set of signaling patterns.

24. The method of claim 17, wherein the one or more time drift reference signals are allocated to a single antenna port that is quasi-colocated with at least one antenna port associated with the one or more demodulation reference signals.

25. The method of claim 17, further comprising:
transmitting a frequency domain allocation for the one or more time drift reference signals, the frequency domain allocation indicating a first set of resources allocated for the one or more time drift reference signals relative to a second set of resources allocated for data.

26. The method of claim 17, further comprising:
receiving an indication of one or more allocation bandwidth thresholds associated with the one or more time drift reference signals, wherein a bandwidth associated with the one or more time drift reference signals is based at least in part on an modulation and coding scheme and the one or more allocation bandwidth thresholds.

27. The method of claim 17, wherein a sequence associated with the one or more time drift reference signals comprises a low peak to average power ratio sequence.

28. An apparatus for wireless communication at a user equipment (UE), comprising:
one or more processors;
memory coupled with the one or more processors; and
one or more instructions stored in the memory and executable by the one or more processors to cause the apparatus to, based at least in part on the one or more instructions:
transmit one or more messages indicating a capability of the UE to support reception of demodulation reference signals and time drift reference signals according to one or more signaling patterns;
receive, based at least in part on the capability of the UE, one or more control messages indicating a first signaling pattern for one or more demodulation reference signals via a set of transmission time intervals, the first signaling pattern corresponding to a first allocation periodicity for the one or more demodulation reference signals, and indicating a second signaling pattern for one or more time drift reference signals via the set of transmission time intervals, the second signaling pattern corresponding to a second allocation periodicity that is associated with the first allocation periodicity, wherein the first signaling pattern corresponds to the second signaling pattern; and
receive a downlink shared channel, the one or more demodulation reference signals, and the time drift reference signals via the set of transmission time intervals, the downlink shared channel multiplexed with the one or more demodulation reference signals according to the first signaling pattern and multiplexed with the one or more time drift reference signals according to the second signaling pattern.

29. An apparatus, comprising:
one or more processors;
memory coupled with the one or more processors; and
one or more instructions stored in the memory and executable by the one or more processors to cause the apparatus to, based at least in part on the one or more instructions:
receive one or more messages indicating a capability of a user equipment (UE) to support reception of demodulation reference signals and time drift reference signals according to one or more signaling patterns;
transmit, based at least in part on the capability of the UE, one or more control messages indicating a first signaling pattern for one or more demodulation reference signals via a set of transmission time intervals, the first signaling pattern corresponding to a first allocation periodicity for the one or more demodulation reference signals, and indicating a second signaling pattern for one or more time drift reference signals via the set of transmission time intervals, the second signaling pattern corresponding to a second allocation periodicity that is associated with the first allocation periodicity, wherein the first signaling pattern corresponds to the second signaling pattern; and
transmit a downlink shared channel, the one or more demodulation reference signals, and the time drift reference signals via the set of transmission time intervals, the downlink shared channel multiplexed with the one or more demodulation reference signals according to the first signaling pattern and multiplexed with the one or more time drift reference signals according to the second signaling pattern.

\* \* \* \* \*